United States Patent
Al-Ali et al.

(10) Patent No.: US 11,346,972 B2
(45) Date of Patent: May 31, 2022

(54) ACQUIRING SEISMIC DATA WITH SEISMIC-WHILE-DRILLING (SWD)

(71) Applicant: Saudi Arabian Oil Company, Dhahran (SA)

(72) Inventors: Mustafa Naser Al-Ali, Bahrain (SA); Abdulaziz Mohammad Almuhaidib, Dammam (SA); Emad Abdo Al-Hemyari, Dhahran (SA); Pavel Golikov, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 514 days.

(21) Appl. No.: 16/284,803

(22) Filed: Feb. 25, 2019

(65) Prior Publication Data

US 2020/0271809 A1 Aug. 27, 2020

(51) Int. Cl.
*G01V 1/50* (2006.01)
*E21B 47/14* (2006.01)
*G01V 1/46* (2006.01)
*G01V 1/42* (2006.01)

(52) U.S. Cl.
CPC .............. *G01V 1/50* (2013.01); *E21B 47/14* (2013.01); *G01V 1/42* (2013.01); *G01V 1/46* (2013.01); *G01V 2200/16* (2013.01)

(58) Field of Classification Search
CPC ........ G01V 1/50; G01V 1/46; G01V 2200/16; G01V 1/42; E21B 47/14
USPC ...................................................... 367/57–58
See application file for complete search history.

(56) References Cited

U.S. PATENT DOCUMENTS

| | | | | |
|---|---|---|---|---|
| 4,207,619 | A | * | 6/1980 | Klaveness ................ G01V 1/42 367/36 |
| 4,474,250 | A | | 10/1984 | Dardick |
| 4,922,362 | A | * | 5/1990 | Miller .................... G01V 1/366 367/38 |
| 4,993,001 | A | | 2/1991 | Winbow et al. |
| 5,012,453 | A | * | 4/1991 | Katz ....................... G01V 1/28 367/38 |
| 5,109,947 | A | | 5/1992 | Rector et al. |

(Continued)

FOREIGN PATENT DOCUMENTS

WO 2014195495 12/2014

OTHER PUBLICATIONS

Anchliya, Abhishek. "A Review of Seismic While Drilling (SWD) Techniques: A Journey from 1986 to 2005." Paper presented at the SPE Europec/EAGE Annual Conference and Exhibition, Vienna, Austria, Jun. 2006. doi: https://doi.org/10.2118/100352-MS (Year: 2006).*

(Continued)

*Primary Examiner* — Ian J Lobo
(74) *Attorney, Agent, or Firm* — Fish & Richardson P.C.

(57) ABSTRACT

Techniques for determining a drill bit location includes identifying a plurality of acoustic energy signals received at a plurality of sets of acoustic receivers from a passive acoustic energy source that is part of a wellbore drilling system; processing the plurality of acoustic energy signals; determining a location of a drill bit of the wellbore drilling system based on the processed plurality of acoustic signals; and updating a geo-steering path of the drill bit based on the determined location of the drill bit.

23 Claims, 39 Drawing Sheets

(56) References Cited

U.S. PATENT DOCUMENTS

| | | | |
|---|---|---|---|
| 5,191,557 | A | 3/1993 | Rector et al. |
| 5,678,643 | A | 10/1997 | Robbins et al. |
| 6,084,826 | A | 7/2000 | Keggett |
| 6,088,294 | A | 7/2000 | Leggett, III et al. |
| 6,196,350 | B1 | 3/2001 | Minto |
| 6,614,360 | B1 | 9/2003 | Leggett, III et al. |
| 7,602,669 | B2 | 10/2009 | Korneev et al. |
| 9,234,974 | B2 | 1/2016 | Yang |
| 2005/0034917 | A1 | 2/2005 | Mathiszik et al. |
| 2006/0077757 | A1 | 4/2006 | Cox et al. |
| 2007/0064532 | A1* | 3/2007 | Haldorsen ............... G01V 1/42 367/57 |
| 2013/0870866 | | 4/2013 | Kolle |
| 2013/0286787 | A1* | 10/2013 | Kolle ............... G01V 1/133 367/143 |
| 2016/0130938 | A1* | 5/2016 | Koll ............... E21B 49/003 367/27 |

OTHER PUBLICATIONS

Artman et al., "Source location using time-reverse imaging," Geophysical Prospecting, vol. 58, 2010, 13 pages.

Berkhout et al., "Comprehensive assessment of seismic acquisition geometries by focal beams—Part I: Theoretical considerations," Geophysics, vol. 66, No. 3, May 2001, 7 pages.

Korneev et al., "Tube-wave monitoring of oil fields," SEG Technical Program Expanded Abstracts, Society of Exploration Geophysicists, SEG/New Orleans 2006, Annual Meeting, 2006, 5 pages.

Poletto, "Energy balance of a drill-bit seismic source, part 1: Rotary energy and radiation properties," Society of Exploration Geophysicists, Geophysics, vol. 70(2), Mar. 2005, 16 pages.

Radtke et al., "Low-Frequency Drill Bit Seismic While Drilling," OTC 20250, Offshore Technology Conference, May 4-7, 2009, 10 pages.

Rector et al., "Radiation pattern and seismic waves generated by a working roller-cone drill bit," Geophysics vol. 57, No. 10, Oct. 1992, 2 pages, Abstract Only.

Rector et al., "The use of drill-bit energy as a downhole seismic source," Geophysics, vol. 56, No. 5, May 1, 1991, 7 pages.

Sava and Vlad, "Wide-azimuth angle gathers for wave-equation migration," Geophysics vol. 76, No. 3, May-Jun. 2011, 11 pages.

Sava, "A comparative review of wavefield tomography methods," CWP-802, 2011, 26 pages.

Al-Muhaidib et al., "Drillcam: A fully integrated real-time system to image and predict ahead and around the bit," SEG International Exposition and 88th Annual Meeting, SEG Technical Program Expanded Abstracts, Aug. 2018, 719-723.

Hemyari et al., "DrillCam seismic system to aid geosteering and drilling optimization," SPE 194876, presented at the SPE Middle East Oil and Gas Show and Conference, Manama, Bahrain, Mar. 18-21, 2019; Society of Petroleum Engineers, 2019, 12 pages.

PCT International Search Report and Written Opinion in International Appln. No. PCT/US2020/019431, dated May 27, 2020, 15 pages.

GCC Examination Report issued in Gulf Cooperation Council Appln. No. 2020-3 9244, dated Aug. 23, 2021, 4 pages.

GCC Examination Report issued in Gulf Cooperation Council Appln. No. 2020-39244, dated Dec. 14, 2021, 5 pages.

* cited by examiner

FIG. 4B

| TIME | OPERATIONAL STATUS | ACTIVITY BREAKDOWN | CLASSIFICATION |
|---|---|---|---|
| | | CONNECTION / STATIONARY / TRIPPING OUT / TRIPPING IN / INVALID PARAMETERS / CIRCULATION WITHOUT ROTATION | TRIPPING / STATIONARY / INVALID PARAMETERS |
| 20:00 | | | |
| 20:30 | | | |
| 21:00 | | | |
| KICK ALERTS | | CONNECTION | |
| SPP | | DELTA SPP | |
| 0.00 PSI | | N/A | |
| HOOK LOAD | | DELTA HOOK LOAD | |
| 65.70 KLBF | | N/A | |

FROM FIG. 4A — TO FIG. 4C

400

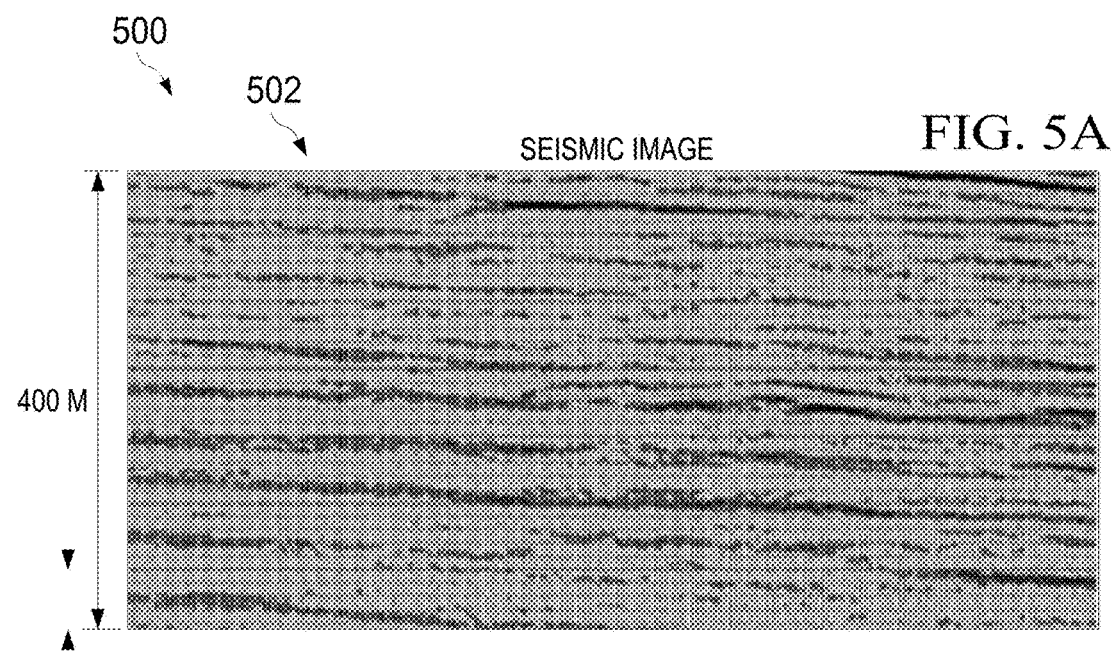

IMAGES OF YELLOW LINE

GEOMETRY

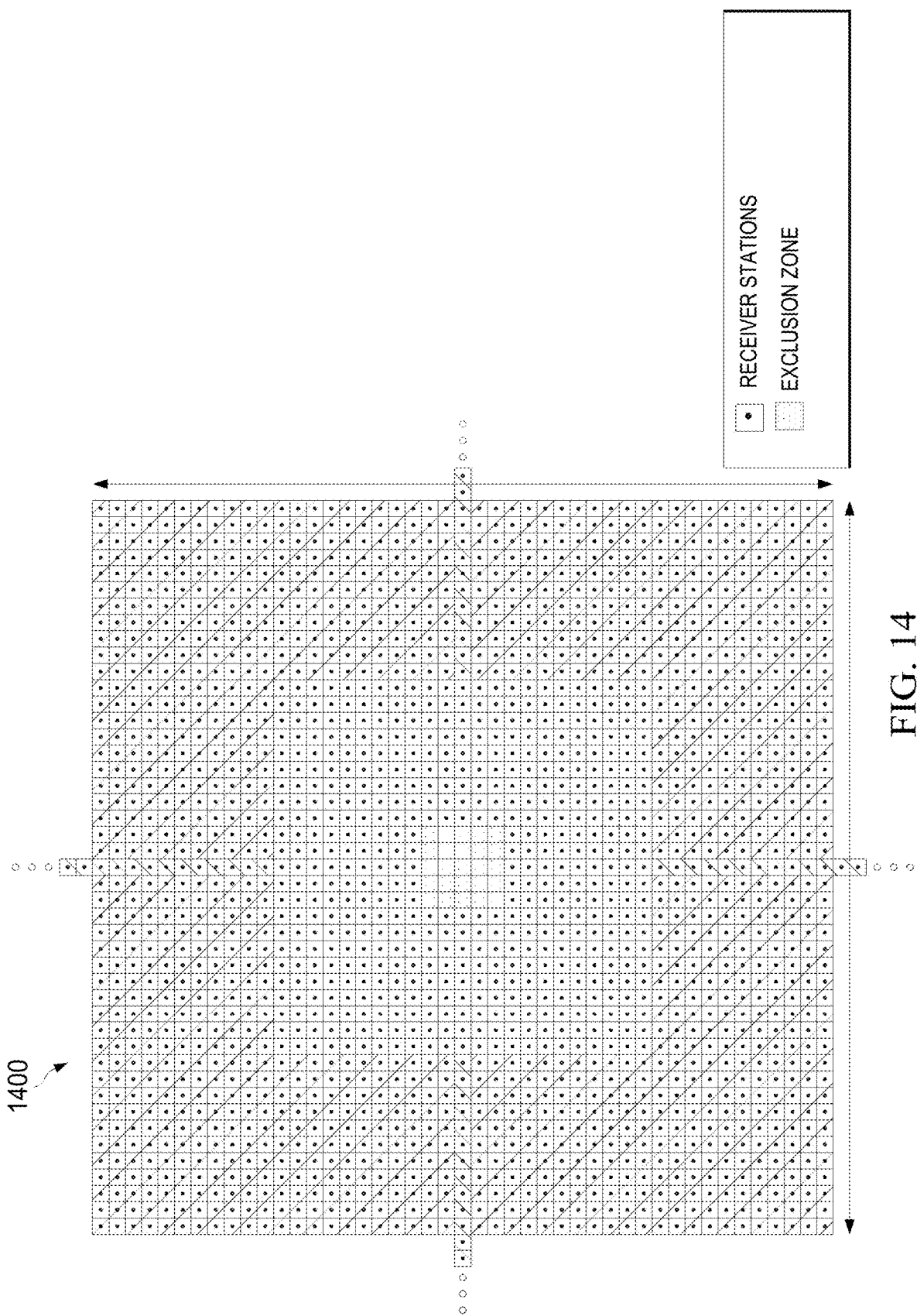

IMAGES OF YELLOW LINE

GEOMETRY

IMAGES OF YELLOW ZONE

GEOMETRY

IMAGES OF YELLOW LINE

GEOMETRY

ACQUIRING SEISMIC DATA WITH SEISMIC-WHILE-DRILLING (SWD)

TECHNICAL FIELD

The present disclosure relates to systems and methods for acquiring seismic data and, more particularly, acquiring seismic data with seismic-while-drilling (SWD) systems and methods.

BACKGROUND

During drilling operations, drillers often rely on previous drilling information, ongoing drilling measurements, and drilling cuttings that are correlated against each other to give indications about the formations being drilled. This methodology may result in delays of information to drillers that prevent them from making prompt decisions, thereby imposing risks. The risk increases even more when these decisions to be made are of importance to the safety of the drilling staff, equipment, and the integrity of drilled wells.

SUMMARY

In a general implementation, a method for drilling a wellbore includes operating a seismic-while-drilling (SWD) system to initiate formation of a wellbore from a terranean surface toward a subterranean zone at a particular depth beneath the terranean surface. The SWD system includes a passive acoustic energy source that includes at least a portion of a drilling string and a set of acoustic energy receivers positioned at the terranean surface. The method further includes, during the formation of the wellbore, recording acoustic signals produced by the passive acoustic energy source with the set of acoustic energy receivers. The method further includes processing the recorded acoustic signals to predict a subterranean location of the passive acoustic energy source. The method further includes, based on the predicted subterranean location of the passive energy source, geo-steering the passive acoustic energy source with the SWD system toward the particular depth beneath the terranean surface.

In an aspect combinable with the example implementation, the passive acoustic energy source includes a drilling bit of the SWD system In another aspect combinable with any of the previous aspects, the set of acoustic energy receivers include a first set.

In another aspect combinable with any of the previous aspects, recording acoustic signals produced by the passive acoustic energy source with the set of acoustic energy receivers includes recording acoustic signals produced by the passive acoustic energy source with the first set of acoustic energy receivers between the terranean surface and a first depth.

Another aspect combinable with any of the previous aspects further includes recording acoustic signals produced by the passive acoustic energy source with a second set of acoustic energy receivers between the first depth and a second depth deeper than the first depth, the second set of acoustic energy receivers positioned on the terranean surface.

Another aspect combinable with any of the previous aspects further includes recording acoustic signals produced by the passive acoustic energy source with a third set of acoustic energy receivers between the second depth and a third depth deeper than the second depth, the third set of acoustic energy receivers positioned on the terranean surface.

In another aspect combinable with any of the previous aspects, the first depth is at 250 meters, the second depth is at 500 meters, and the third depth is at 1000 meters.

In another aspect combinable with any of the previous aspects, the first set of acoustic energy receivers is spaced at a first geometry on the terranean surface, the second set of acoustic energy receivers is spaced at a second geometry on the terranean surface, and the third set of acoustic energy receivers is spaced at a third geometry on the terranean surface.

In another aspect combinable with any of the previous aspects, the first geometry covers a first spatial area on the terranean surface, the second geometry covers a second spatial area on the terranean surface larger than the first spatial area, and the third geometry covers a third spatial area on the terranean surface larger than the second spatial area.

In another aspect combinable with any of the previous aspects, processing the recorded acoustic signals to predict a subterranean location of the passive acoustic energy source includes cross-correlating the recorded acoustic signals from different ones of the acoustic receivers in the set of acoustic receivers; determining travel-time difference images of the recorded acoustic signals from the passive acoustic energy source and the different ones of the acoustic receivers in the set of acoustic receivers; and stacking the travel-time difference images.

In another example implementation, a seismic-while-drilling (SWD) system includes a drilling system that includes a drilling rig, a drill string, and a drilling bit. The drilling system is configured to initiate formation of a wellbore from a terranean surface toward a subterranean zone at a particular depth beneath the terranean surface. The drilling system includes a passive acoustic energy source; an acoustic receiver system that includes a set of acoustic energy receivers positioned at the terranean surface; and an acoustic energy processing system configured to perform operations. The operations include recording acoustic signals produced by the passive acoustic energy source with the set of acoustic energy receivers during the formation of the wellbore, processing the recorded acoustic signals to predict a subterranean location of the passive acoustic energy source, and based on the predicted subterranean location of the passive energy source, controlling the drilling system to geo-steer the drilling bit toward the particular depth beneath the terranean surface.

In an aspect combinable with the example implementation, the passive acoustic energy source includes the drilling bit of the drilling system.

In another aspect combinable with any of the previous aspects, the set of acoustic energy receivers include a first set of acoustic energy receivers configured to receive the acoustic signals produced by the passive acoustic energy source between the terranean surface and a first depth.

Another aspect combinable with any of the previous aspects further includes a second set of acoustic energy receivers positioned on the terranean surface and configured to receive the acoustic signals produced by the passive acoustic energy source between the first depth and a second depth deeper than the first depth.

In another aspect combinable with any of the previous aspects, the acoustic energy processing system is configured to perform operations including recording acoustic signals produced by the passive acoustic energy source with the second of acoustic energy receivers during the formation of the wellbore.

Another aspect combinable with any of the previous aspects further includes a third set of acoustic energy receivers positioned on the terranean surface and configured to receive the acoustic signals produced by the passive acoustic energy source between the second depth and a third depth deeper than the second depth.

In another aspect combinable with any of the previous aspects, the acoustic energy processing system is configured to perform operations including recording acoustic signals produced by the passive acoustic energy source with the third of acoustic energy receivers during the formation of the wellbore.

In another aspect combinable with any of the previous aspects, the first depth is at 250 meters, the second depth is at 500 meters, and the third depth is at 1000 meters.

In another aspect combinable with any of the previous aspects, the first set of acoustic energy receivers is spaced at a first geometry on the terranean surface, the second set of acoustic energy receivers is spaced at a second geometry on the terranean surface, and the third set of acoustic energy receivers is spaced at a third geometry on the terranean surface.

In another aspect combinable with any of the previous aspects, the first geometry covers a first spatial area on the terranean surface, the second geometry covers a second spatial area on the terranean surface larger than the first spatial area, and the third geometry covers a third spatial area on the terranean surface larger than the second spatial area.

In another aspect combinable with any of the previous aspects, the operation of processing the recorded acoustic signals to predict a subterranean location of the passive acoustic energy source includes cross-correlating the recorded acoustic signals from different ones of the acoustic receivers in the set of acoustic receivers; determining travel-time difference images of the recorded acoustic signals from the passive acoustic energy source and the different ones of the acoustic receivers in the set of acoustic receivers; and stacking the travel-time difference images.

In another example implementation, a computer-implemented method for determining a drill bit location includes identifying, with one or more hardware processors of an acoustic energy processing system, a plurality of acoustic energy signals received at a plurality of sets of acoustic receivers from a passive acoustic energy source that is part of a wellbore drilling system. The computer-implemented method further includes processing, with the one or more hardware processors of the acoustic energy processing system, the plurality of acoustic energy signals. The computer-implemented method further includes determining, with the one or more hardware processors of the acoustic energy processing system, a location of a drill bit of the wellbore drilling system based on the processed plurality of acoustic signals. The computer-implemented method further includes updating, with the one or more hardware processors of the acoustic energy processing system, a geo-steering path of the drill bit based on the determined location of the drill bit.

In an aspect combinable with the example implementation, the passive acoustic energy source includes at least one of the drill bit or one or more casing collars of the drilling system.

In another aspect combinable with any of the previous aspects, each of the plurality of sets of acoustic receivers cover a unique spatial area and is configured to detect at least a portion of the plurality of acoustic energy signals at a unique depth range beneath the terranean surface.

Another aspect combinable with any of the previous aspects further includes validating, with the one or more hardware processors of the acoustic energy processing system, a unique geometry of each set of the plurality of sets of acoustic receivers.

In another aspect combinable with any of the previous aspects, processing includes cross-correlating the recorded acoustic signals from different ones of the acoustic receivers in each set of the plurality of sets of acoustic receivers; determining travel-time difference images of the recorded acoustic signals from the passive acoustic energy source and the different ones of the acoustic receivers in the set of acoustic receivers; and stacking the travel-time difference images.

Implementations according to the present disclosure may include one or more of the following features. For example, implementations according to the present disclosure may provide better signal to noise ratios as compared to conventional SWD systems, which have an inherit problem of low signal to noise ratios due to the small number of receivers used in the recording and the large amount of noise generated while drilling operations are being performed. As another example, implementations of the present disclosure may better detect usable seismic signals while drilling. Further, implementations of the present disclosure may provide a real time seismic while drilling system that is large in scale, flexible, and adaptive. As another example, implementations of the present disclosure may provide a validation method for the acquisition parameters to optimally focus on and image targets of interest with variable depths during SWD. Also, implementations of the present disclosure may provide for a large acquisition scale that allows recording of the near and far energy fields to allow for better signal and noise separation in consecutive data processing and analysis steps.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

FIGS. 4A-4C illustrate an example of historical drilling information and parameters that are used in the workflow of FIG. 1 according to the present disclosure.

FIG. 5A-5D illustrate an example of regional petrophysical data extracted from seismic images that is used in the workflow of FIG. 1 according to the present disclosure.

Figure 11A:
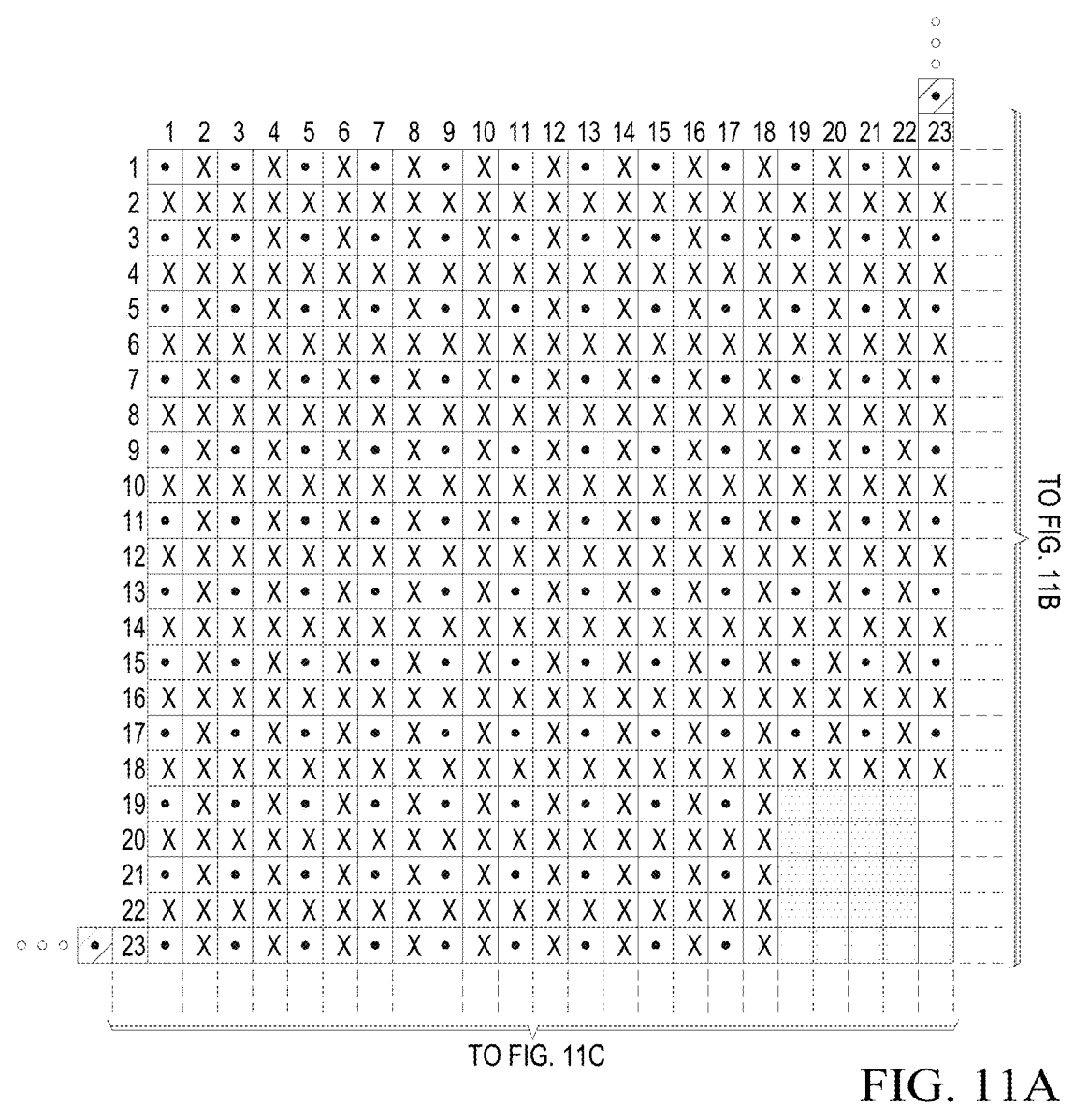
Figure 11C:
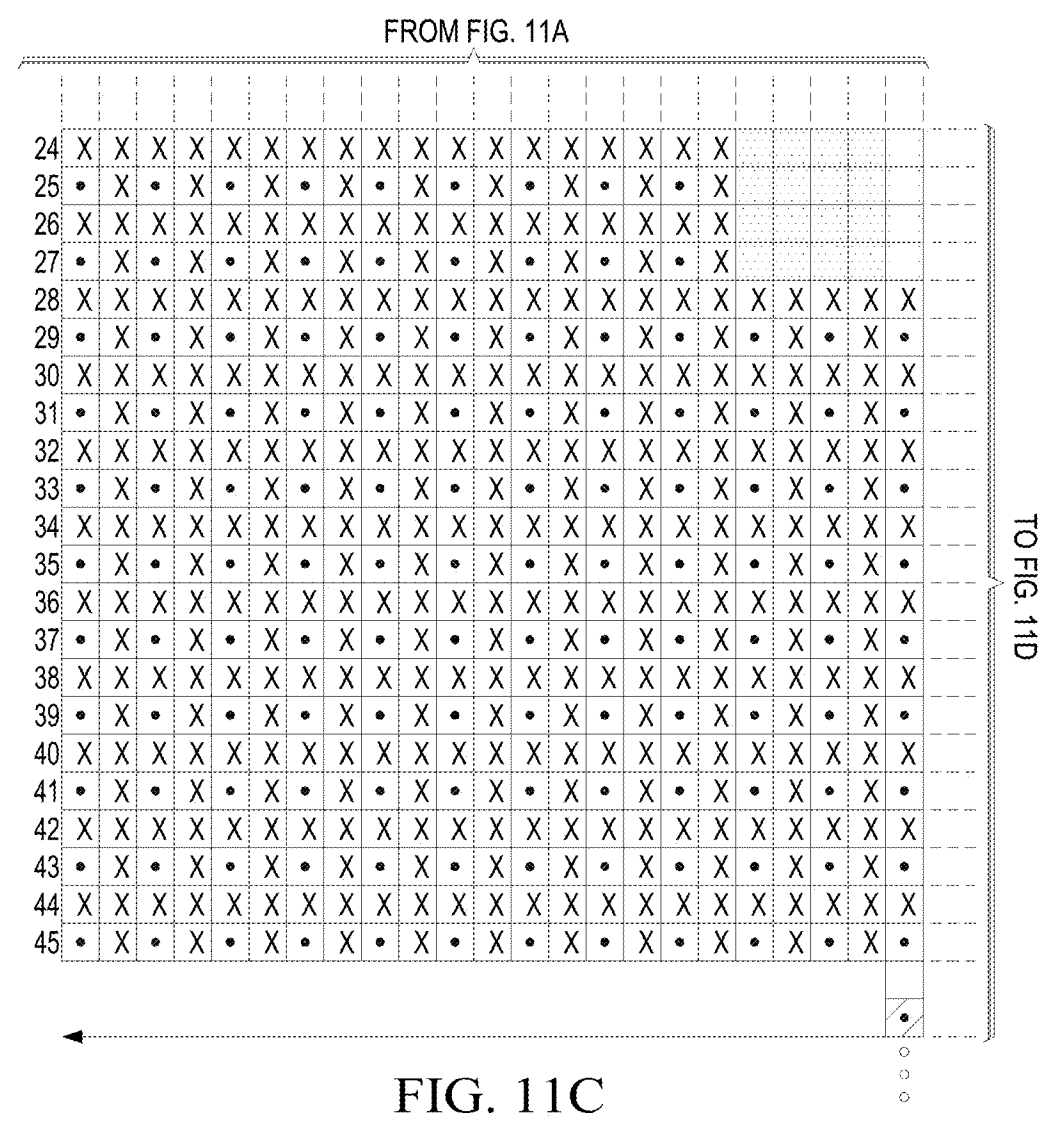

FIGS. 11A-11D illustrate an example implementation of a symmetric acquisition geometry centered on the wellhead and targeting shallow depths according to the present disclosure.

FIG. 14 illustrates an example symmetric acquisition geometry centered on the wellhead and targeting slightly deeper depths according to the present disclosure.

DETAILED DESCRIPTION

Figure 1:
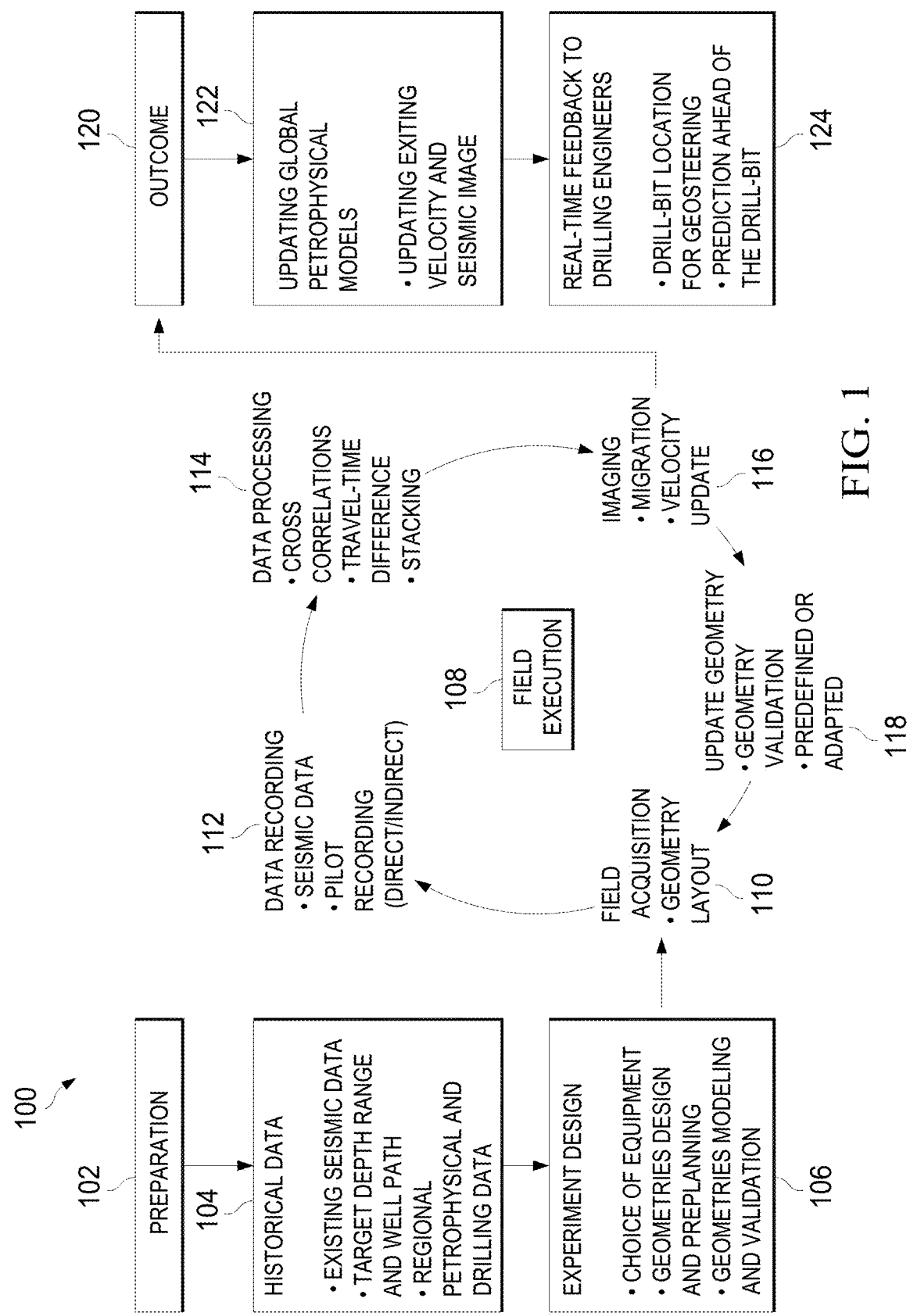
FIG. 1 illustrates an example workflow for a real-time seismic-while-drilling (SWD) process according to the present disclosure.

FIG. 1 illustrates an example workflow 100 for a real-time seismic-while-drilling (SWD) system and process. In some aspects, the real-time SWD system (for example, shown in FIG. 8) provides real-time insight and information to drilling and geo-steering personnel to be able to make informed decisions regarding ongoing drilling programs and steering directions. The illustrated workflow 100 includes a preparation process 102, an execution process 108, and an outcome process 120. In some aspects, the preparation stage 102 precedes the field execution stage 108 to ensure quality of collected data and ensure smooth execution. The execution stage 108 happens in real-time at the field where data is collected, processed, and imaged iteratively while drilling operations are occurring. The outcome of this workflow 100 is a real-time feedback 124 to drilling engineers about the drill-bit location, predicting ahead of the drill-bit and more.

As shown in FIG. 1, the execution stage 108 includes the following sub-steps of the workflow 100, including a field acquisition step 110, a data recording step 112, a data processing step 114, and imaging step 116, and a geometry update step 118. In the field acquisition step 110, a geometry layout is determined. In the data recording step 112, seismic data is recorded, as well as direct and indirect pilot recording. In step 114, the recorded data is processed, such as by cross-correlation, travel-time difference processing (of acoustic waves), and stacking. In imaging step 116, migration and velocity update are performed. Finally, in the geometry update 118, the determined geometry (for example, of the relationship between passive acoustic source and acoustic sensors) is validated. In some aspects, a computing system such as an acoustic energy processing system may implement all or parts of execution stage 108.

In this example, the outcome stage 120 includes two sub-stages. For example, as shown, global petrophysical models generated by the workflow 100 are updated in sub-stage 122. This sub-stage 122 can include updating existing velocity and seismic images. Further, real-time feedback (for example, concerning the drill bit location) is provided to the drilling engineers for geo-steering. Also, a predicted path ahead of the drill bit is provided to the drilling engineers.

Figure 2:
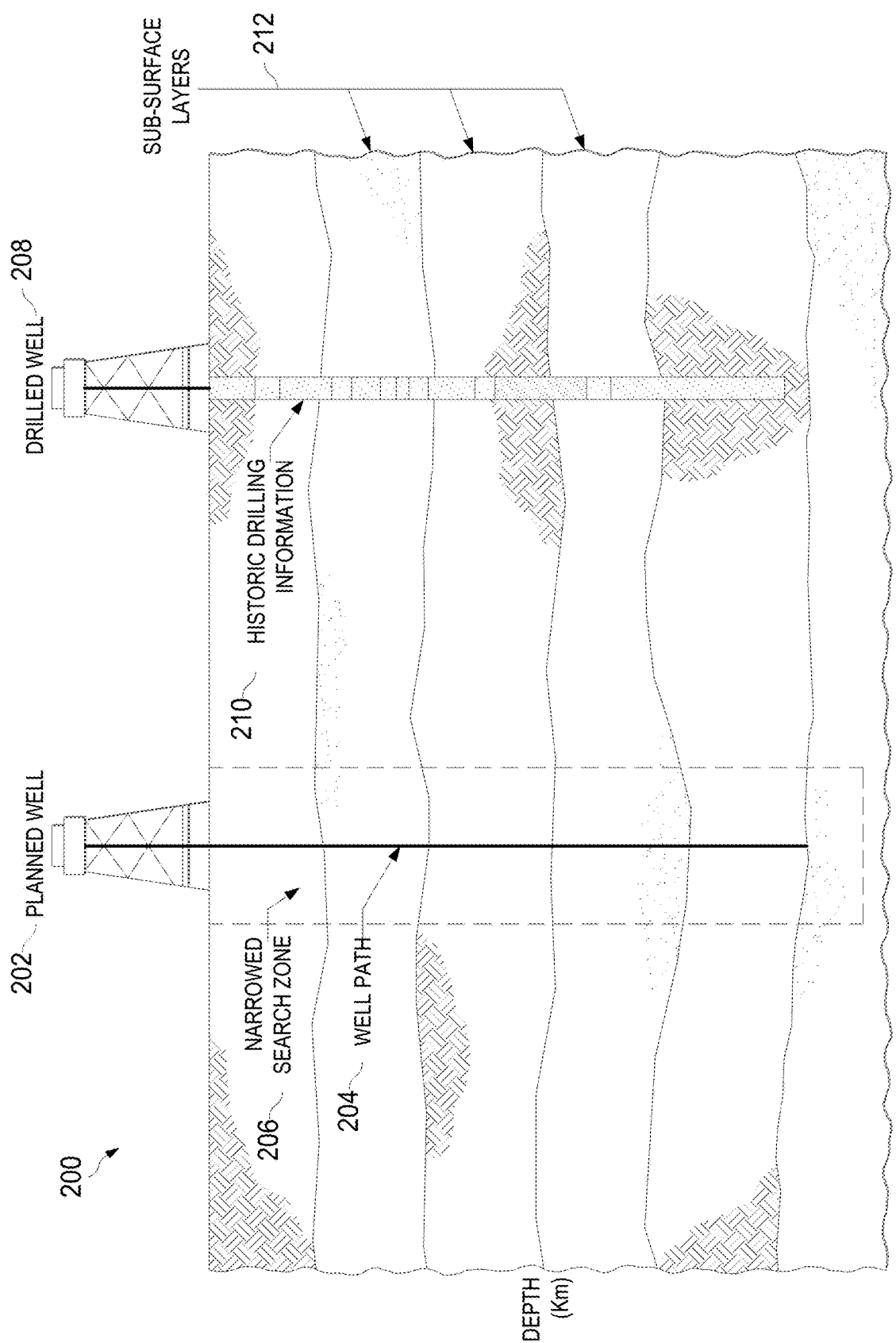
FIG. 2 is an example of historic data that is used in the workflow of FIG. 1 according to the present disclosure.

In this example, in the preparation stage 102, historical data 104 and experimental design data 106 may be looked at to define, for example, the target drilling depth ranges where seismic data are to be recorded while the SWD system operates. For example, historical data 102 may include existing regional seismic data, a planned well path, historic drilling information about nearby wells (near the planned well path), and regional petrophysical data. Existing regional seismic data, for example, can provide images of the subsurface formations or layers to be drilled. This data usually comes in a three-dimensional (3D) volumetric form covering a certain surface area and penetrating to a certain depth into earth. The limits of such data may be denoted by the surface coordinates and depth (X, Y, Z). Further, such images usually come from seismic surveys that have been acquired in the same areas as the area of the planned well path. FIG. 2, for instance, shows a cross-sectional image 200 that could have a spatial coverage of tens of kilometers (km) and several kilometers in depth, for example 0-4 km. Other related data can also be used is the terrain maps collected during the acquired seismic surveys to correctly reconstruct the seismic data in preparation for processing.

In some examples, the planned well path narrows down the drill-bit search zone to a single path and what is around the proposed path. This path may be used to check which layers from the seismic image the well path will go through during drilling operations with the SWD system. Such information can also be used to predict the drilling timeline as different layers of rock take different times to drill through due to their variable hardness and physical properties. In other words, the rate of penetration (ROP) of the drill-bit into each formation is calculated or estimated as part of the planned well path. The cross-sectional image 200 shows a vertical well path 204 from a planned 202. Also, a narrowed search zone 206 is shown. Drilled well 208 is shown in this figure, which represents a previously drilled well into the sub-surface layers 212, which generates historic drilling information 210.

Figure 3:
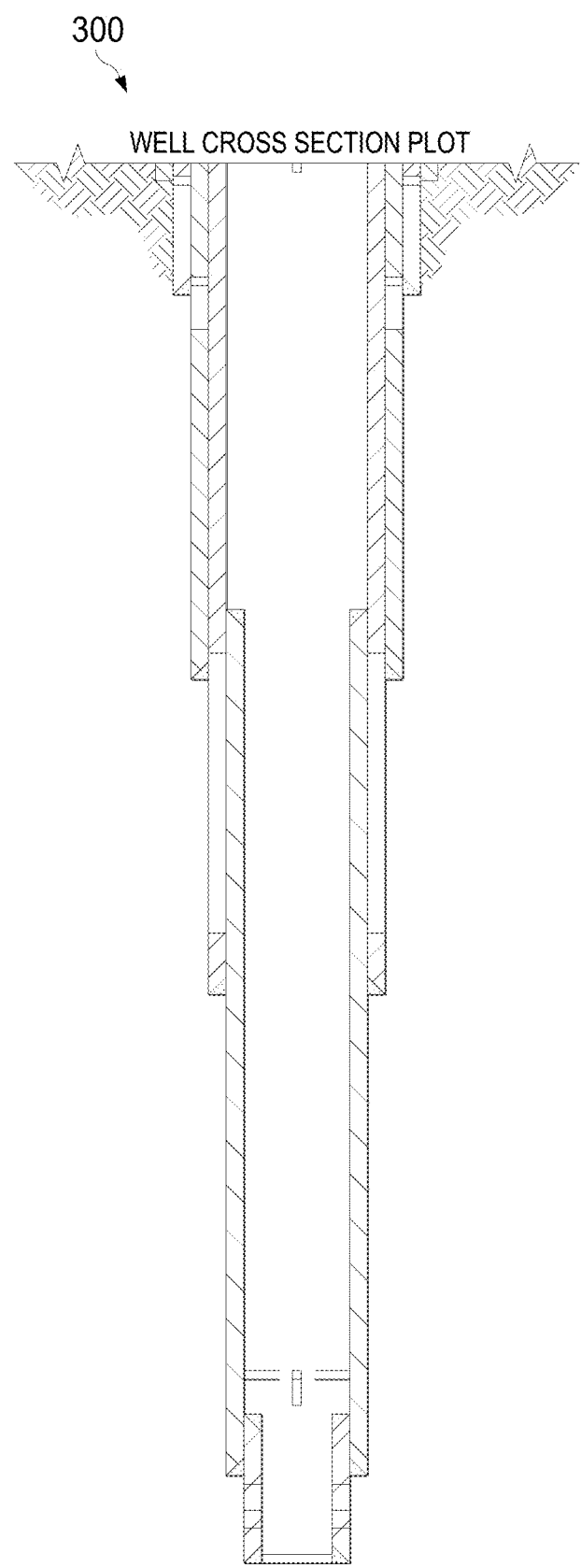
FIG. 3 is an example of well casing data that is used in the workflow of FIG. 1 according to the present disclosure.

Other useful information that can be used is the well casing plan 300 shown in FIG. 3. FIG. 3 is an example plan 300, which shows the design and measurements of well casing pipes that are lowered into the well during drilling to prevent the walls from collapsing into the created void by drilling. These casing pipes also serve as a safety measurement to contain the drilling fluids and protect for sudden pressure increases due to pressurized fluids coming out of drilled formations or rocks. FIG. 3 shows a well cross section plot for well casings going down to a vertical depth of 2 km. These casings are usually joined together using shorter pipes (for example, in a casing string). These joints may act as amplifiers to sound waves travelling through drilling fluids due to acoustic energy created by a passive downhole acoustic energy source, such as a drill bit of the SWD system or drilling string vibrations. Thus, knowledge of the casing design may add information about the locations of these casing joints and helps in, for instance, either eliminating their effects on recorded signals or in using them as secondary sources of signals providing information from adjacent formations.

Figure 4A:
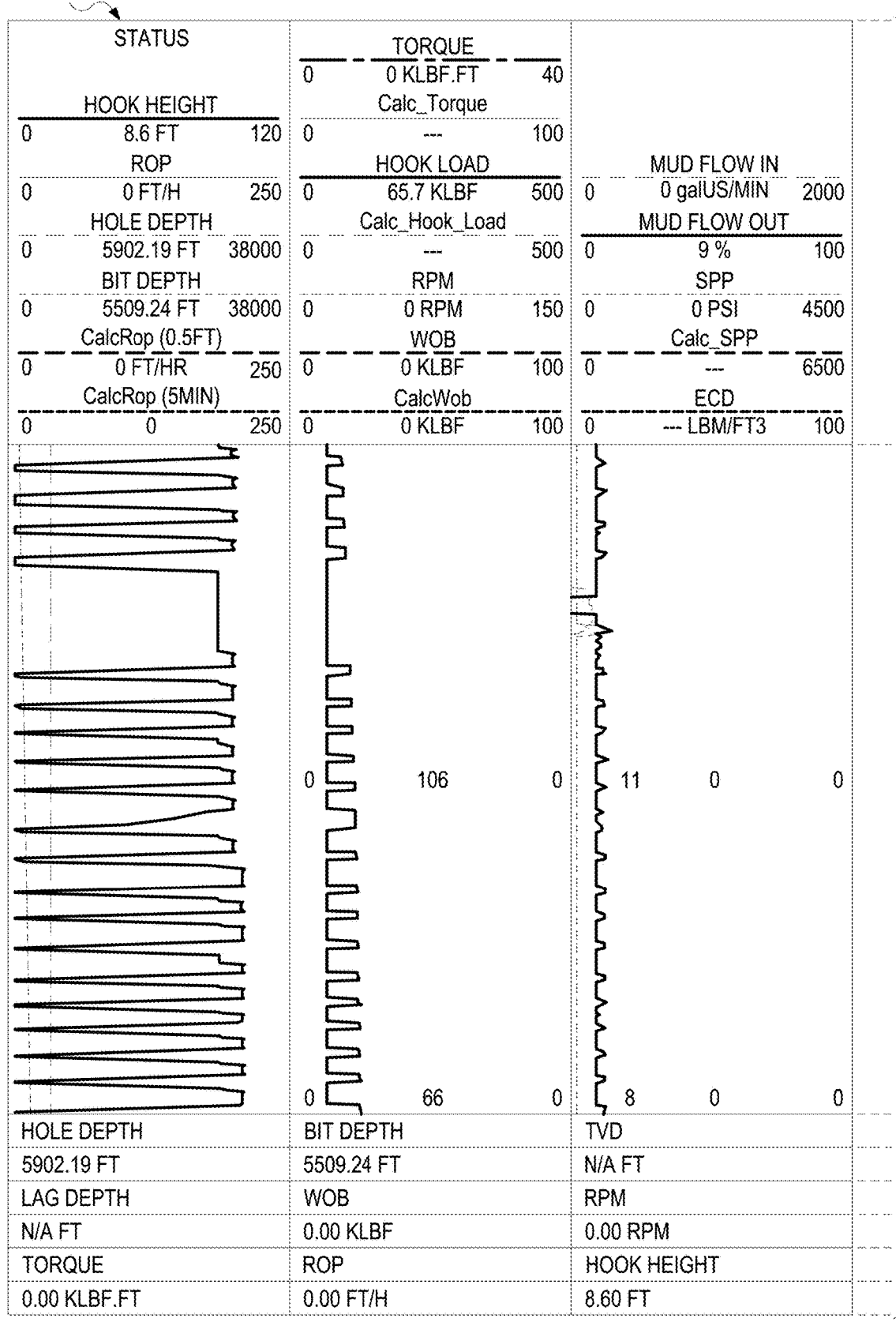
Figure 4C:
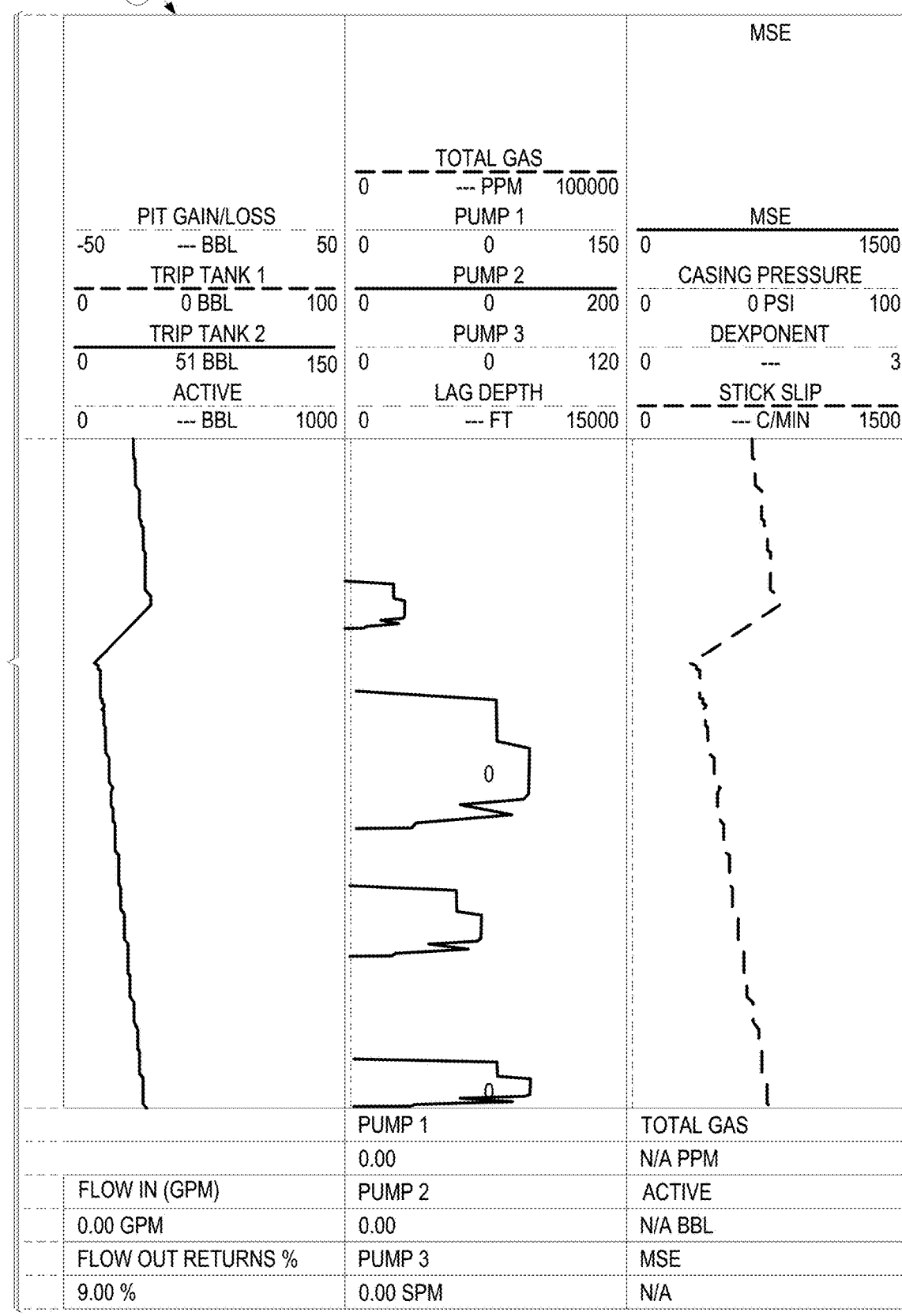
Figure 5C:
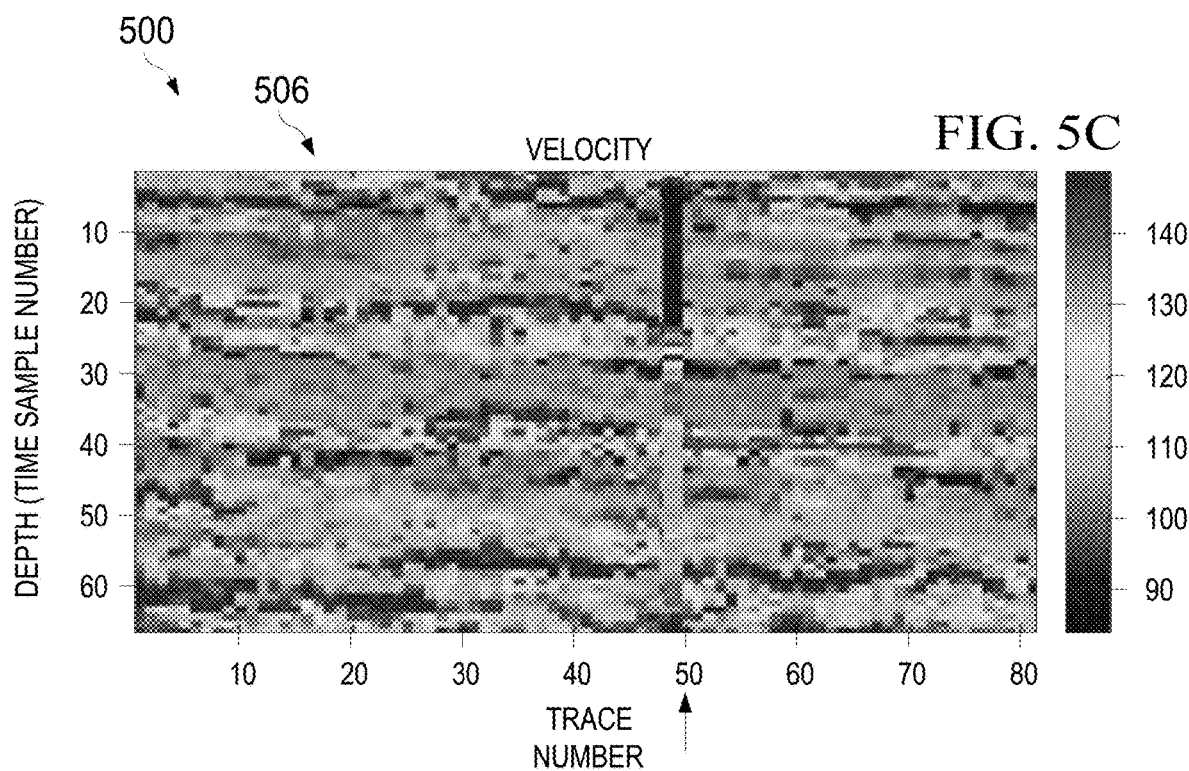
Figure 5D:
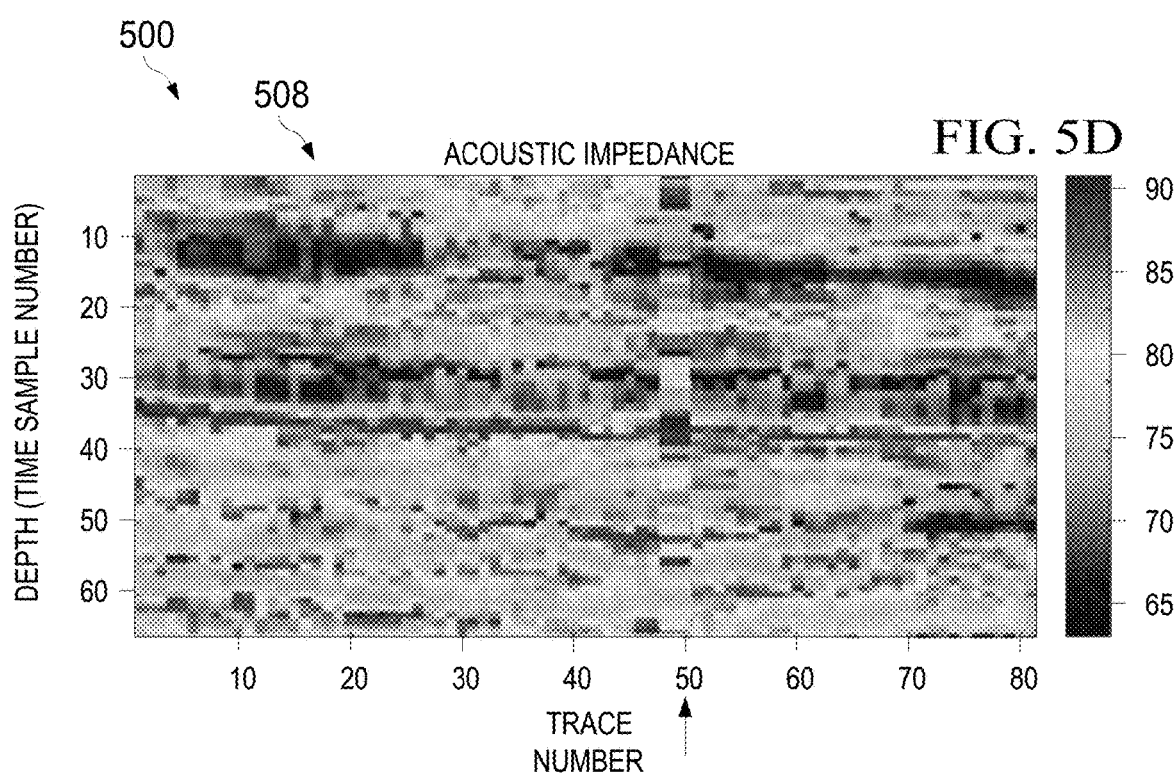

Nearby wells historic drilling information (shown as reference 210 in FIG. 2) may provide an insight into faced challenges in drilled wells in the same area. It also provides valuable information required to preplan the seismic data acquisition timeline. This data 210 can include but is not limited to the following measured data, such as drilling ROP, weight on bit (WOB), drill-bit speed of rotation in cycles per minute, torque used to drill through rocks, etc. In addition, other descriptive data such as drilling program activities over time can add value as they usually tend to be similar for drilled wells in the same area. In FIG. 2, the different shades of historic drilling information 210 denote different drilling activities that took place. FIGS. 4A-4C show an example of measured drilling information and parameters 400. Other useful information can be the type of equipment as different types of drill-bits emit different amounts of sound waves into the solid rocks being drilled.

Figure 6:
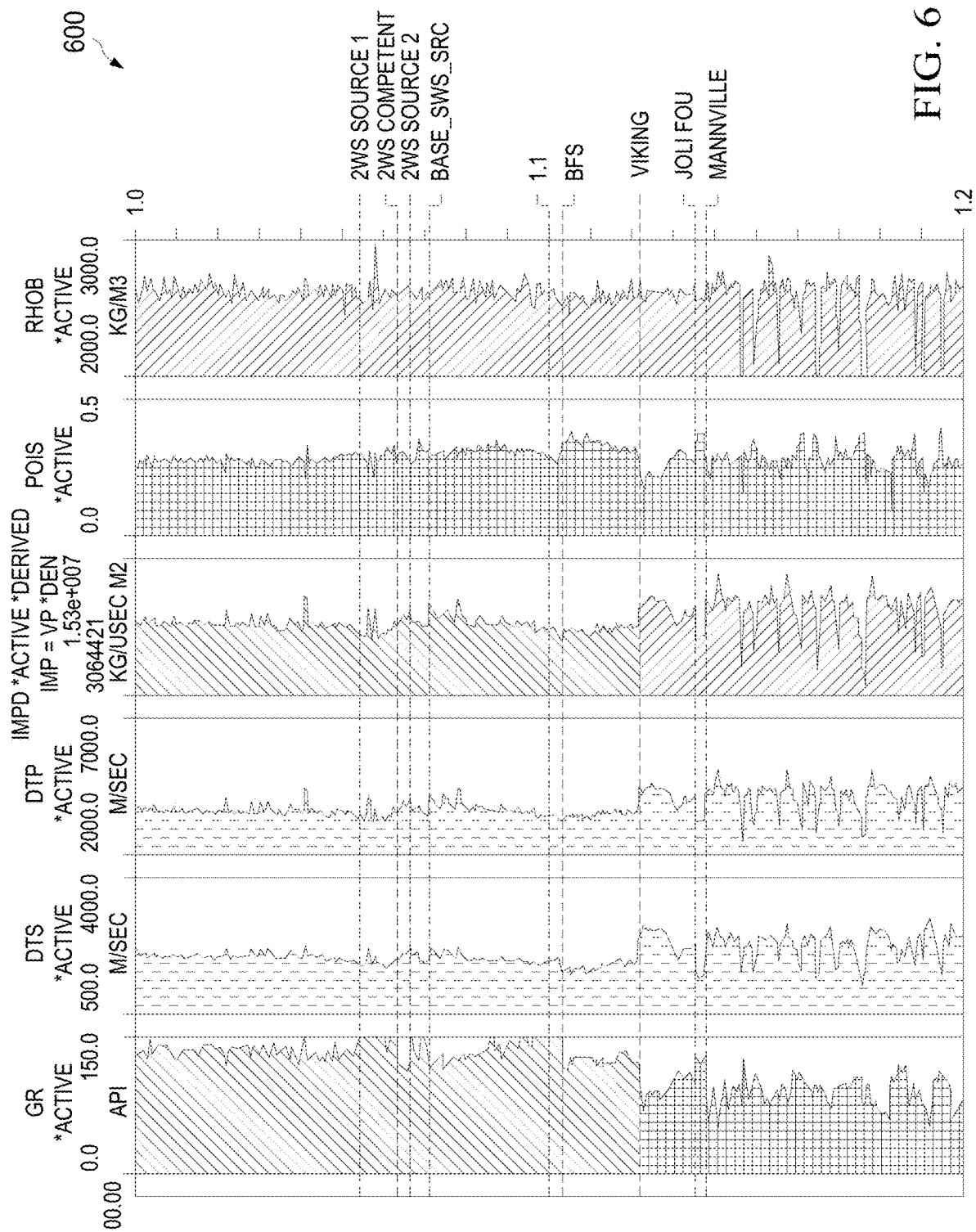
FIG. 6 is an example of petrophysical data from a sonic well log that is used in the workflow of FIG. 1 according to the present disclosure.

Regional petrophysical data can come from subsurface rock properties extracted from the existing regional seismic images in a volumetric form or from logged wells in a linear form. For example, FIGS. 5A-5D show several petrophysical data 500 extracted from the seismic image 502, including density 504, velocity 506, and acoustic impedance 508. FIG. 6 shows petrophysical data from a seismic well log 600 that is similar data that are limited to the well location and along its path, which are usually used to calibrate the petrophysical data extracted from the seismic images.

Figure 7:
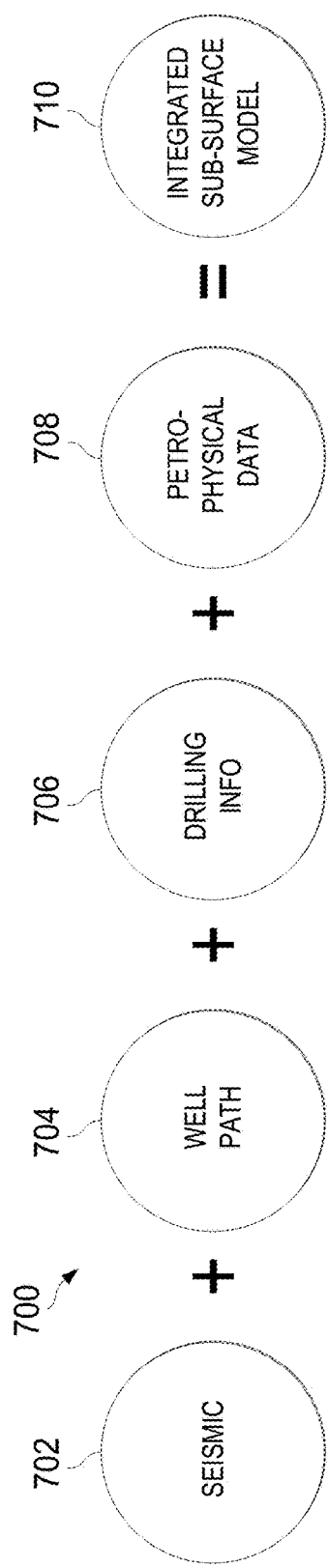
FIG. 7 illustrates an example process for generating an integrated sub-surface model according to the present disclosure.

FIG. 7 illustrates a process 700 for generating an integrated sub-surface model 710 based on the execution of preparation stage 102. For example, all or some of the previously described historical data 104 may be used to create an integrated model of the sub-surface layers and their properties, which will be used in later real-time steps to navigate through and guide drilling operations. The integrated model can be created using statistical, mathematical, machine learning, data analytics and artificial intelligence operations such as interpolation, kriging, curve fitting, correlations and so on. As shown in FIG. 7 and described previously, the historical data 104 includes seismic data 702, well path data 704, drilling information data 706, and petrophysical data 708.

The workflow 100, and specifically preparation stage 102, may also include experiment design sub-step 106. For example, in some aspects, collection of historical data in stage 104 may be followed by experiment design 106, where equipment choices are made, geometries are designed and preplanned for the system 800 (shown in FIG. 8). In addition, modeling studies may be conducted to validate the geometries and their feasibility. For example, experiment design 106 may include choice of equipment. For instance, to achieve the objective of locating and predicting ahead of the drill-bit, a careful choice of equipment has to be made to help ensure that certain objectives are achieved. Such objectives include detecting signals emitted by the drill-bit vibrations and traveling through adjacent formations to the surface. These signals can be detected using surface seismic sensors spread around the monitored well with certain pattern or geometry design. Such objective also include detecting signals emitted by the drilling string vibrations into adjacent formations to the surface. Surface sensors can similarly detect these signals. Such objectives also include detecting signals emitted forward by the drill-bit and reflected back to the surface by deeper formations. Surface sensors can similarly detect these signals. Such objectives also include detecting signals traveling through drilling muds or fluids through the borehole up to the surface. Standpipe pressure sensors for example can detect these signals. Such objectives also include detection of the drill-bit signature in the borehole assembly right uphole of the drill-bit. Downhole sensors installed in a saver-sub or drilling string right uphole of the drill bit can detect these signals. Such objectives also include detection of surface noise generated by various sources at the surface where drilling operations are taking place. High sensitivity surface seismic sensors can detect these signals. Such objectives also include decent sampling of all detected signals in space and time. This may dictate the number of sensors and their dynamic ranges, which will be used on the surface or in the downhole assembly. Finally, such objectives may also include proper focusing on sub-surface signals. This may dictate the areal coverage of surface sensors.

Figure 8:
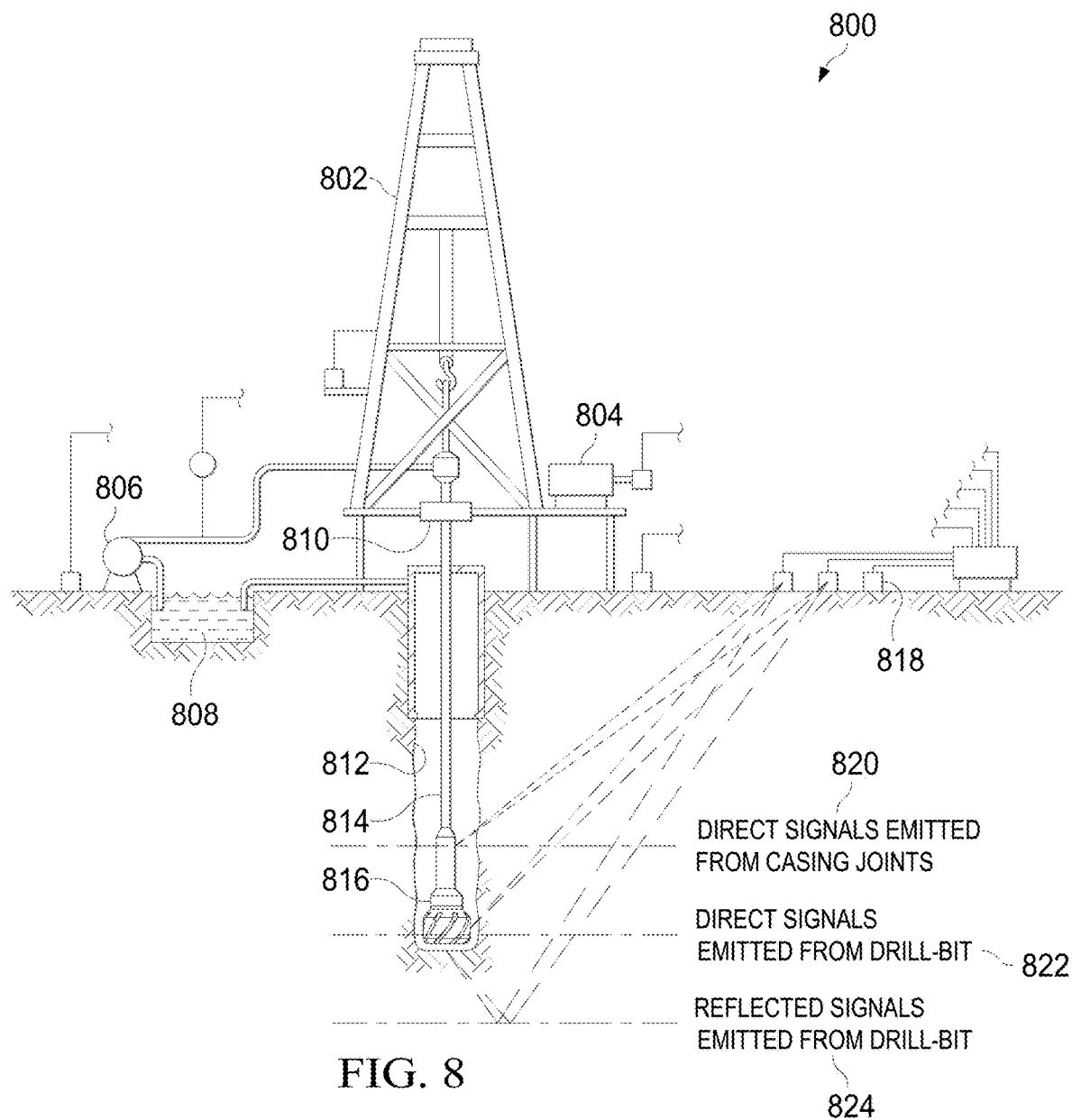
FIG. 8 illustrates an example implementation of a SWD system according to the present disclosure.

To achieve these objectives, certain equipment may be used for recording. For example, surface sensor arrays in the order of few thousands with large spatial coverage to detect all signals coming upward from the sub-surface may be used. Turning to FIG. 8, the shaded patches are an example setting for such sensor arrays. Further, surface sensors in the order of few hundreds near noise or vibration sources may be used for the drilling operations to record the noise and enable later steps to eliminate such noise. For example, FIG. 8 includes example settings for sensor placement locations. In addition, surface sensors to record pilot traces near the drilling string entry point to the ground may be used. Alternatively, the pilot trace may be recorded at or slightly uphole of the drill bit itself. Hence, a downhole sensor or sensors near the drill-bit may be used. Such placement, however, can impose difficulties communicating recorded signals to the surface. Another option is to use stand pipe pressure sensors to record background noise in the drilling fluids and extract the pilot signal from the background noise. In addition, high sensitivity sensors may be used instead of using arrays of conventional geophone sensors. The high sensitivity sensors allow for reduction of the number of sensors required to achieve the same objective. Finally, flexible real-time recording equipment, such as wireless systems, may be used.

FIG. 8 illustrates an example implementation of a SWD system 800 that can be used in execution stage 108 to drill a wellbore and, in real-time, collect seismic data from a passive seismic source in the SWD system 800. As shown, SWD system 800 includes a drilling derrick 802 that operates to drive a rotary table 810 with an electric motor 804 to form wellbore 812 with a drilling bit 816 coupled to a drilling string 814. A drilling mud is pumped by a mud pump 806 from a mud tank 808 through the drilling string 814 to, for example, exit the drilling bit 816 and remove cuttings back to the terranean surface on which the derrick 802 sits. As shown, geophones 818 (acoustic sensors) are mounted on the terranean surface to receive acoustic signals from the drilling bit 816 and other components of the system 800. Such signals include direct signals 820 emitted from casing joints, direct signals 822 emitted from the drilling bit 816, and reflected signals 824 emitted from the drilling bit 816.

Figure 9B:
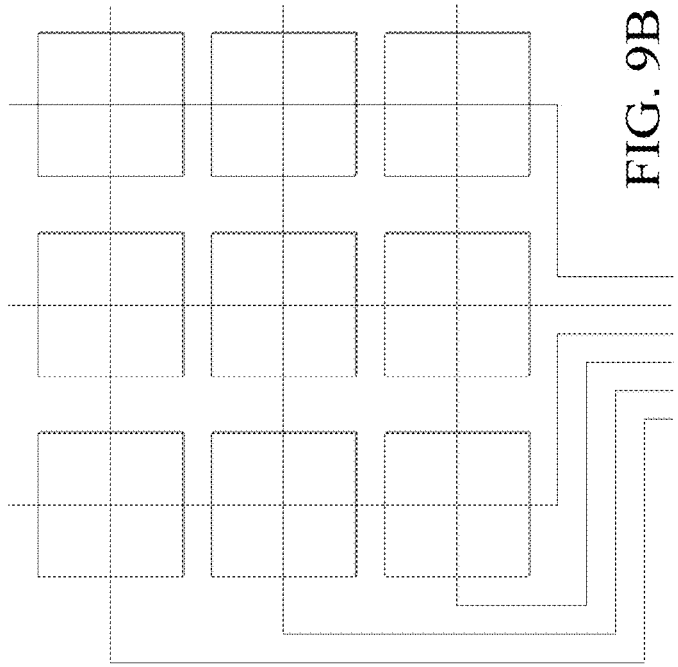
FIGS. 9A-9B illustrate example implementations of seismic sensor arrays according to the present disclosure.
Figure 9A:
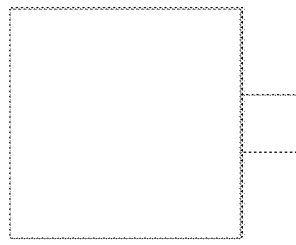

As discussed, the SWD system 800 includes a number of acoustic sensors/sensor arrays. The number of sensors used to acquire seismic data for such experiments can be in the range of few thousands in addition to hundreds of sensors to acquire noise and pilot traces used later for data processing. These sensors can be either conventional geophones, high sensitivity geophones or any other special sensors depending on the preferred array arrangements and acquisition requirements. Within each array, the patterns to be used are numerous. FIGS. 9A-9B illustrate example implementations of seismic sensor arrays. FIG. 9A shows an example array with a single sensing node, while FIG. 9B shows an example with a three by three sensor array, as examples. Some of the main parameters to designing these patterns are the number of sensors in each array, the way these sensors are connected (series or parallel), and the special coverage of the array. The number of sensors within an array may vary based on the sensors sensitivity to signal and not noise. The greater the number of sensors within an array, the higher the sensitivity of the array to record signals depending on how they are connected. The smaller the areal coverage of an array, the less averaging or smoothing on the recorded signal.

Figure 10:
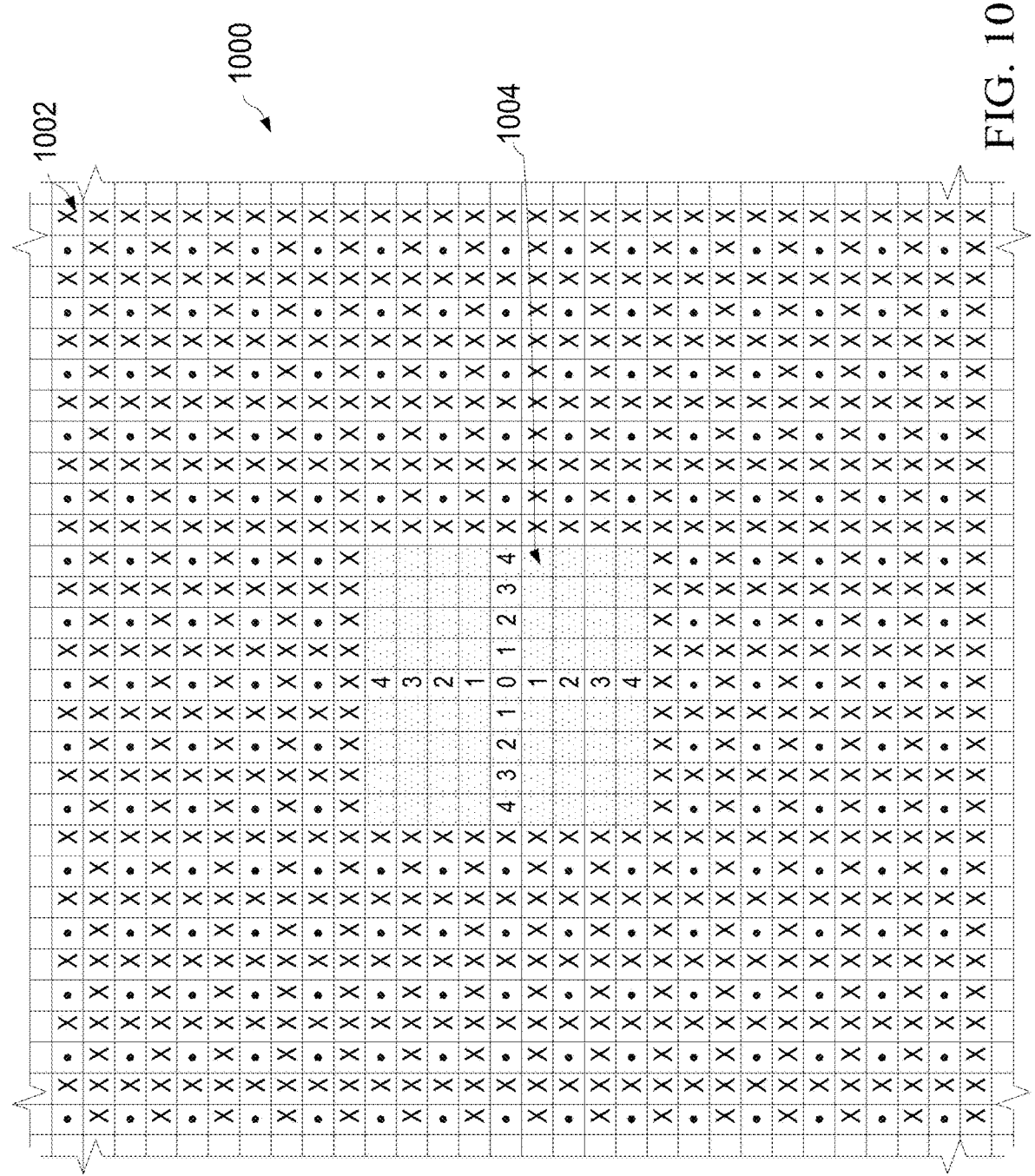
FIG. 10 illustrates an example implementation of a symmetric seismic acquisition geometry according to the present disclosure.
Figure 11B:
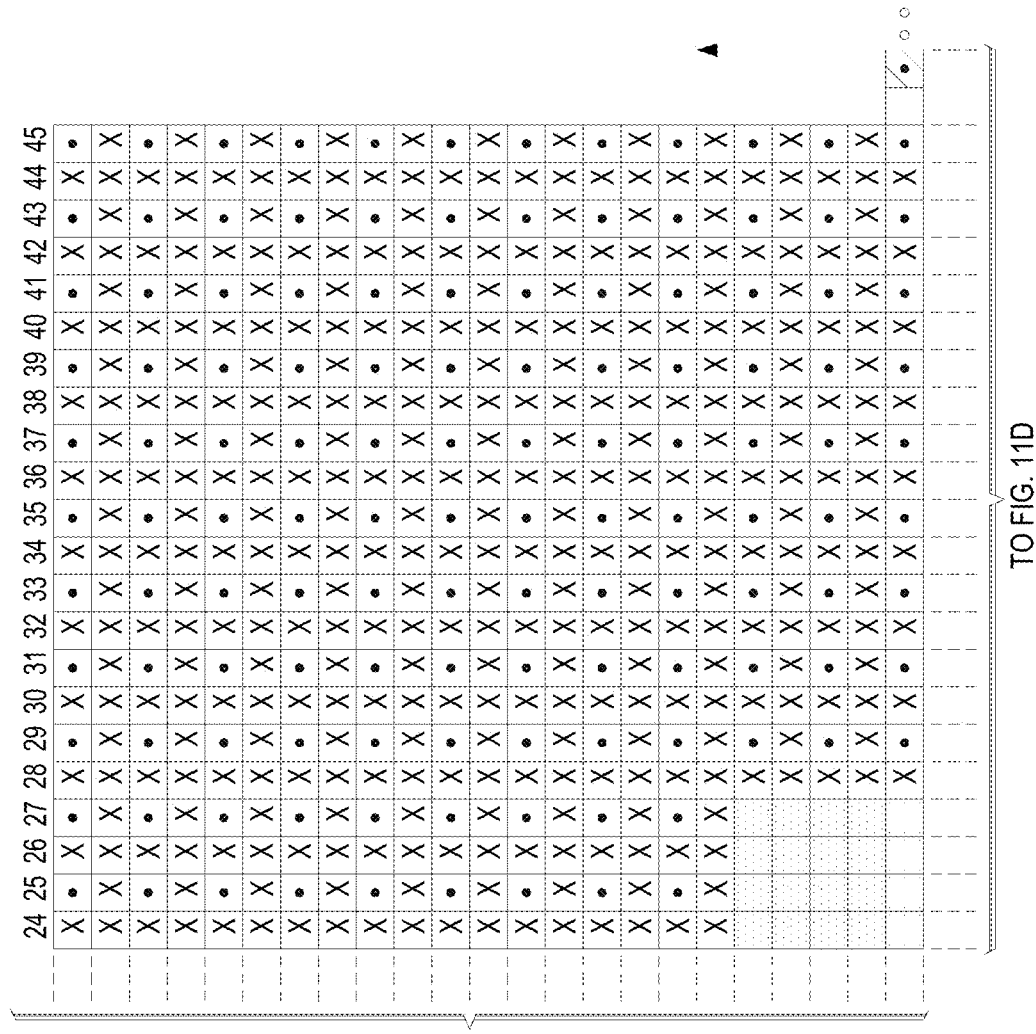
Figure 11D:
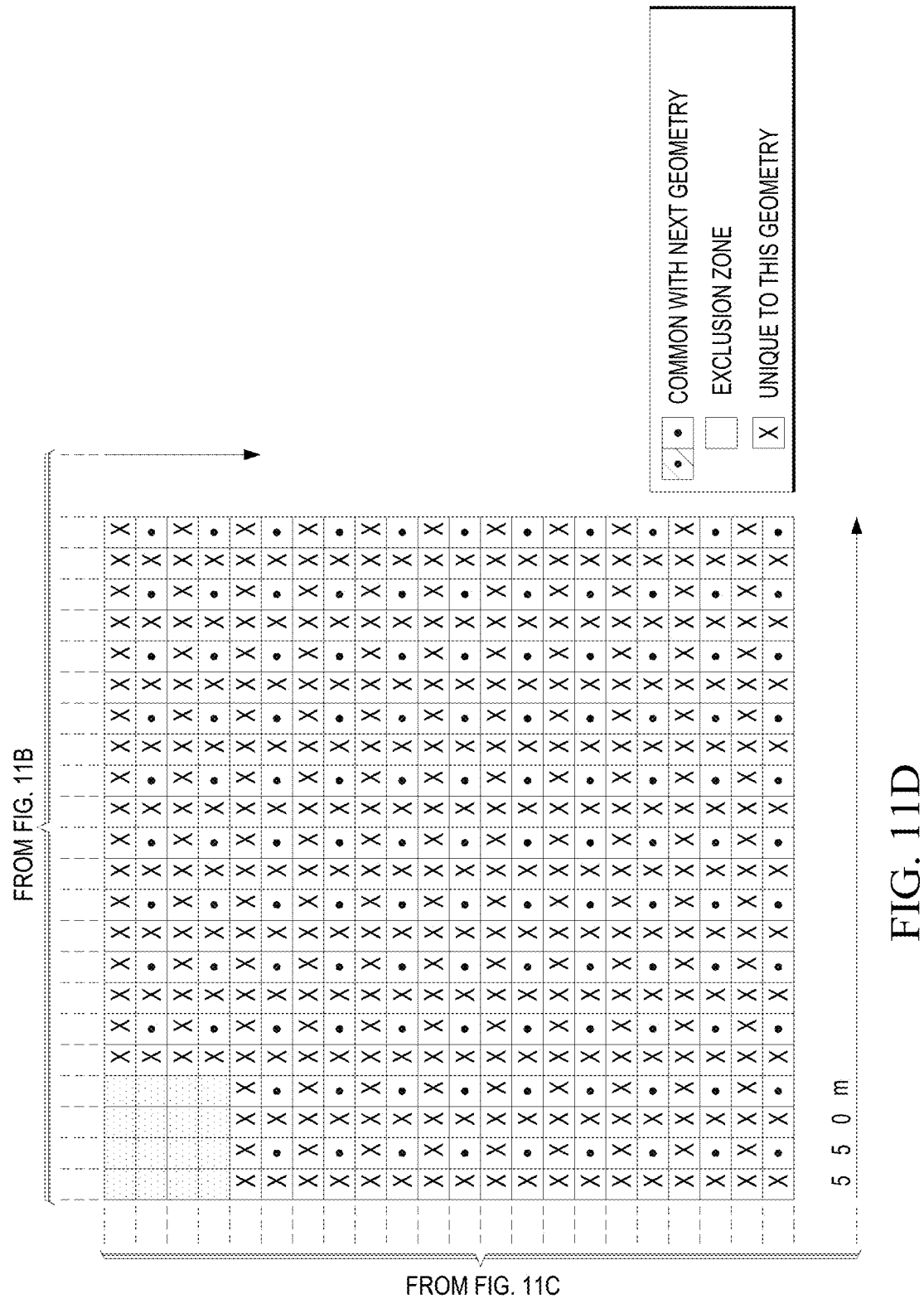

FIG. 10 illustrates an example implementation of a seismic acquisition geometry 1000. In this example, thousands of these independent arrays are formed together in a special pattern to form an acquisition geometry. In FIG. 10, each square 1002 is equivalent to one sensor or sensor array and each square 1004 represents an area of an exclusion zone.

The main parameters used to form an acquisition geometry are: the special sampling, which is the spacing between the centers of sensor arrays; the maximum areal coverage, which is the size of the geometry pattern; and the target depth. These parameters altogether control the signal focusing at a certain target depth. A geometry pattern with small areal coverage or small areal extent will only be best used for shallow target depths. The larger the areal coverage extent of a geometry, the deeper depth of target that geometry can be used to focus on. To ensure proper data focusing at the target for a certain target depth twice as much distance of surface areal coverage may be required. Multiple of these large scale geometries are designed to record seismic data emitted from different ranges of target depths. These multiple large-scale geometries together form a flexible and adaptable acquisition system.

The designed sensor array geometries may be validated iteratively using a focal beam approach within the execution stage 108 prior to making a decision to switch to the next geometry in line. For example, the following suggested acquisition geometries serve as examples for explanatory purposes of their extent and flexible nature. Additionally, they show how an acquisition geometry is designed taking in consideration the variable depths of targets. An actual geometry used with SWD system 800 is not limited to the disclosed three geometry examples in the present disclosure and can be achieved using aerial coverages and different number of geometries based on target depth requirements. On the other hand, the initial field experiment (described later) demonstrates the feasibility of such large scale monitoring systems for the purpose of recording seismic wile drilling. All disclosed geometries share common design aspects such as being centered around the wellhead location and having a flexible exclusion zone (represented by squares 1004 in FIG. 10) that can be sized base on each well's drilling safety requirements. Within this highly active exclusion zone, on the well pad or even on various locations on the drilling rig itself, pilot traces can be recorded to support subsequent data processing and analysis.

FIGS. 11A-11D illustrate an example implementation of a symmetric acquisition geometry 1100 centered on the wellhead and targeting shallow depths. The geometry 1100 targets shallow depths of around 250 meters (m). Geometry 1100 is a hybrid combination of two dimensional (2D) and 3D components centered around the wellhead. The first component is a square patch of dense receivers covering an aerial extent of 0.3 square kilometers ($km^2$) to better image the near field energy generated by shallow targets. To support the processing and analysis of data, the second component consists of two crossing 2D receiver lines at the wellhead and extending 3 km outward from the center to image the far field energy generated by the shallow targets.

Figure 12B:
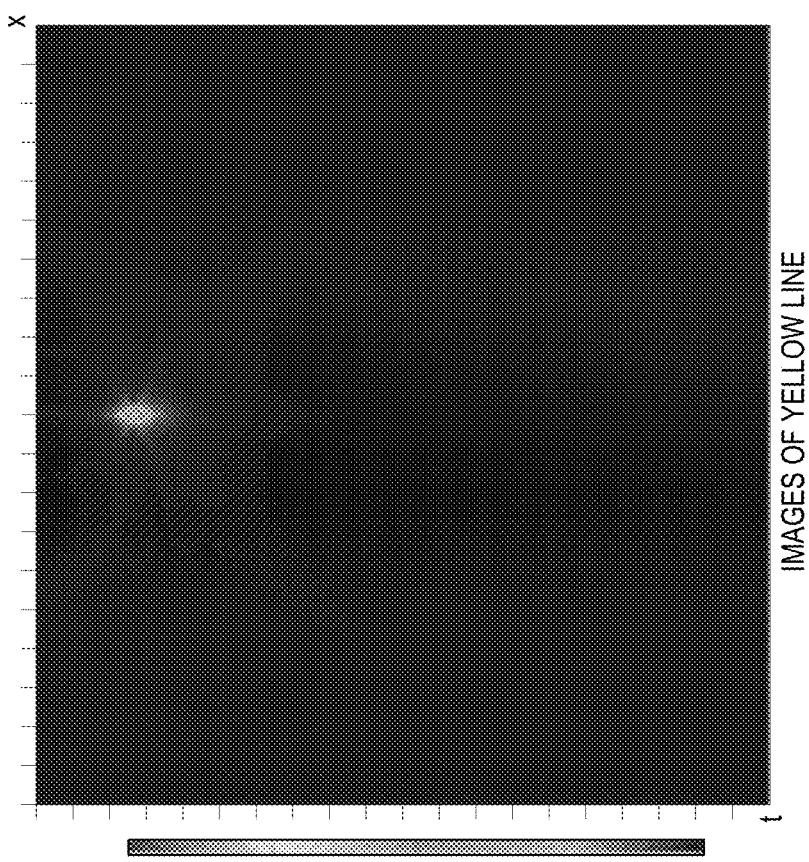
FIGS. 12A-12B illustrate an example first geometry validation step through forward modeling showing a vertical cross-sectional image according to the present disclosure.
Figure 12A:
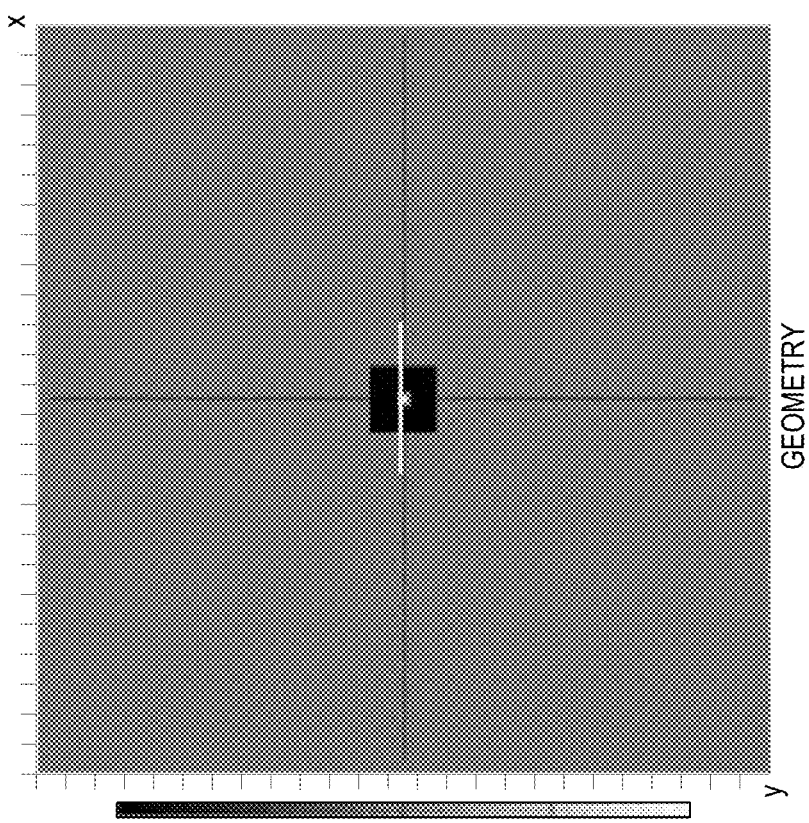
Figure 13B:
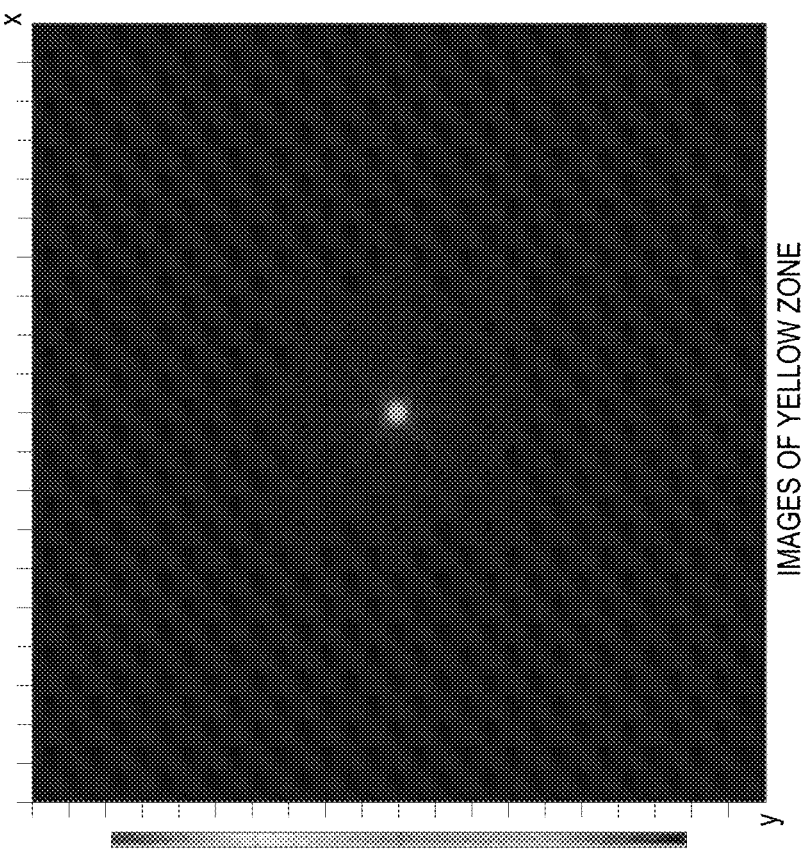
FIGS. 13A-13B illustrate the first geometry validation step through forward modeling showing a horizontal cross-sectional image according to the present disclosure.
Figure 13A:
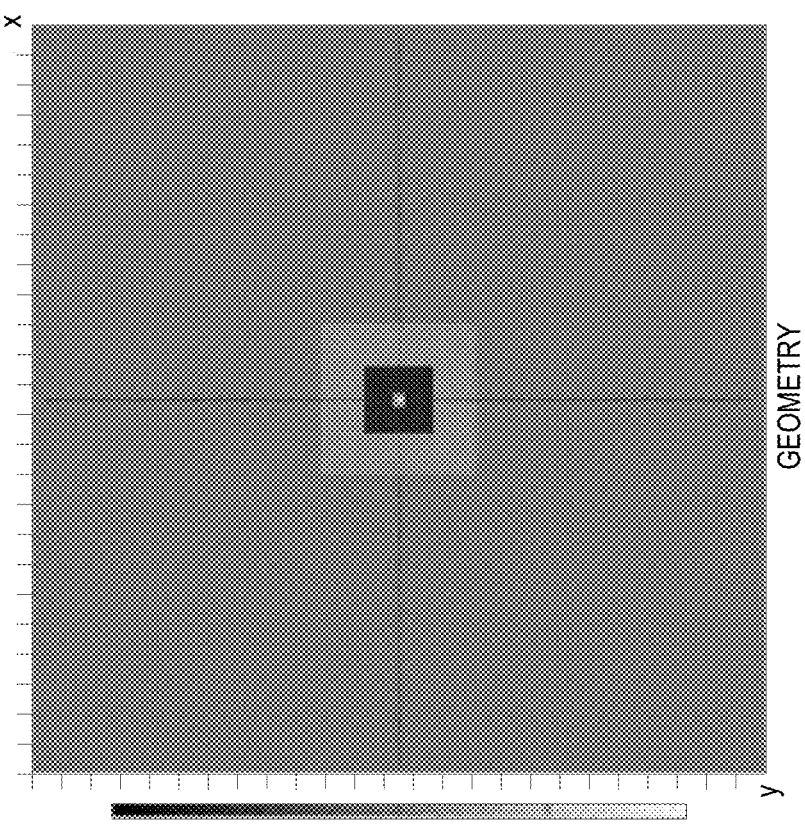

FIGS. 12A-12B illustrate a geometry validation step through forward modeling showing a vertical cross-sectional image for geometry 1100. FIGS. 13A-13B illustrate a geometry validation step through forward modeling showing a horizontal cross-sectional image for geometry 1100. For the validation of the geometry 1100, a forward modelling study was performed to virtually image a target at depth of 900 feet (ft.) and at a constant medium velocity of 2000 meters per second (m/s) with a maximum frequency of 200 hertz (Hz). The forward modeling result in FIGS. 12A-12B and 13A-13B show concentrated energy plops corresponding to the target at 900 ft. This validates the geometry 1100 for imaging shallow targets.

FIG. 14 illustrates a symmetric acquisition geometry 1400 centered on the wellhead and targeting slightly deeper depths. The geometry 1400 targets deeper depths between 250 m to 500 m (in this example). Geometry 1400 is also a hybrid combination of 2D and 3D components centered around the wellhead. Compared to the geometry 1100, the first component is again a square patch of less dense receivers covering a larger aerial extent of 1.2 km² to better image the near field energy generated by slightly deeper targets. The second component is the same as in the geometry 1100 consisting of two crossing 2D receiver lines at the wellhead and extending 3 km outward from the center, which are proposed to image the far field energy generated by the slightly deeper targets.

Figure 15B:
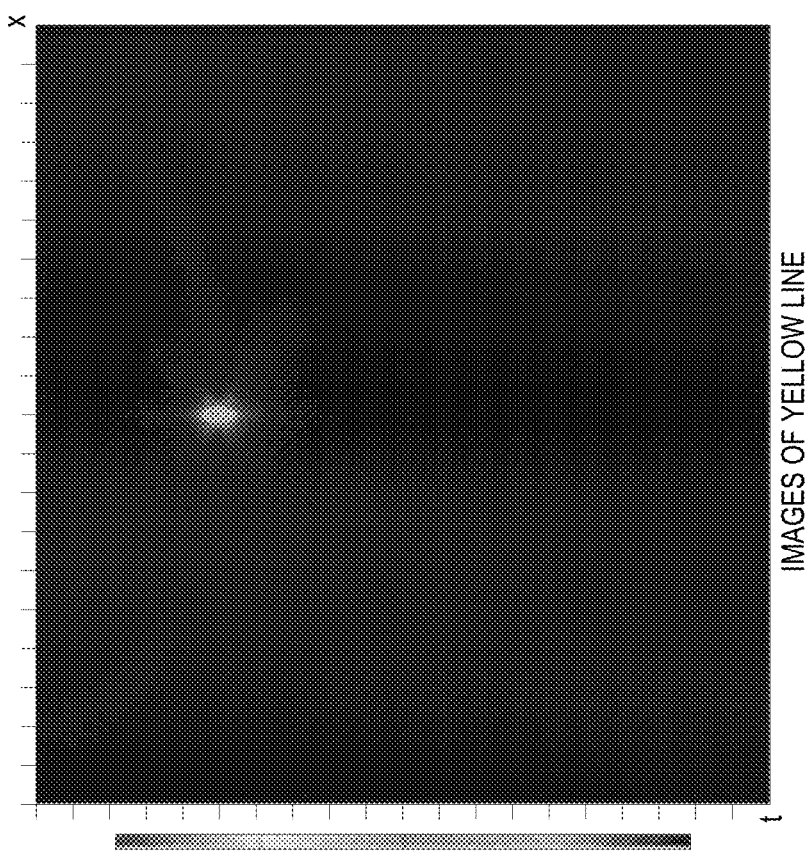
FIGS. 15A-15B illustrate an example second geometry validation step through forward modeling showing a vertical cross-sectional image according to the present disclosure.
Figure 15A:
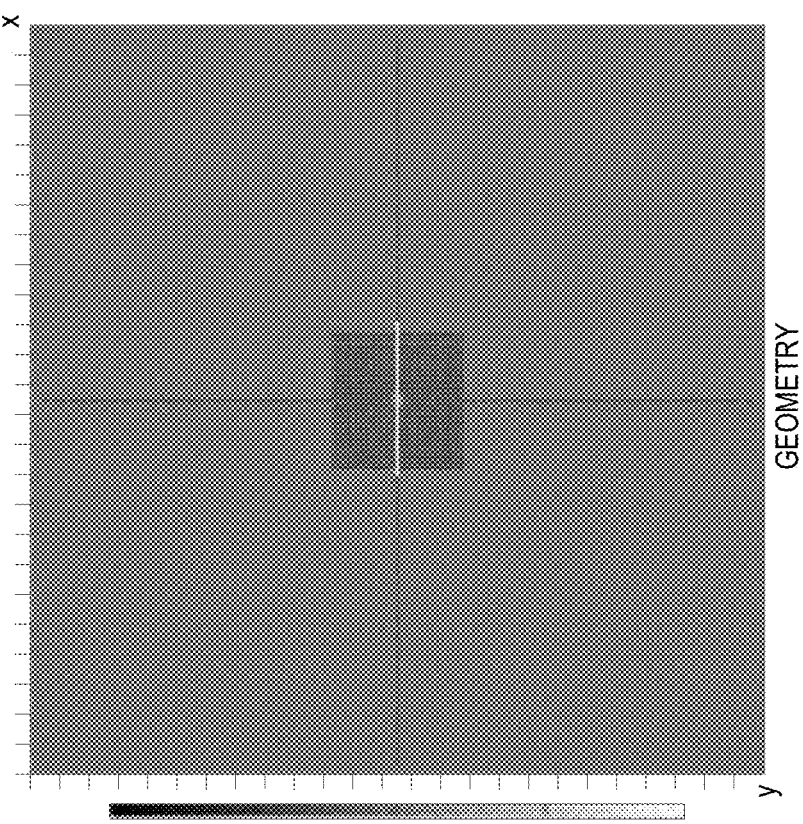
Figure 16B:
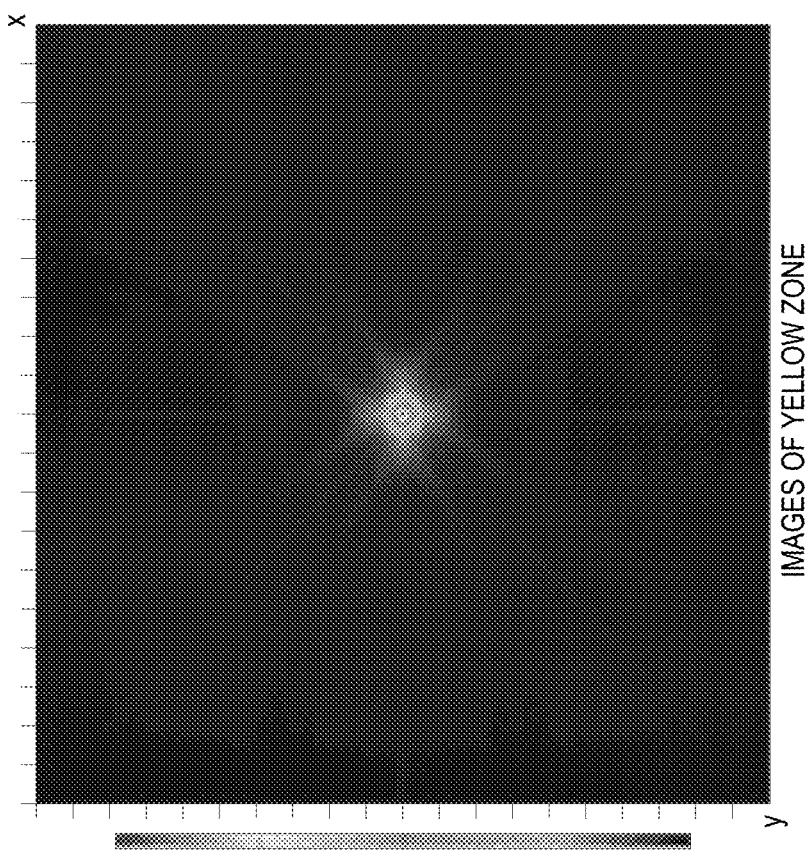
FIGS. 16A-16B illustrate the second geometry validation step through forward modeling showing a horizontal cross-sectional image according to the present disclosure.
Figure 16A:
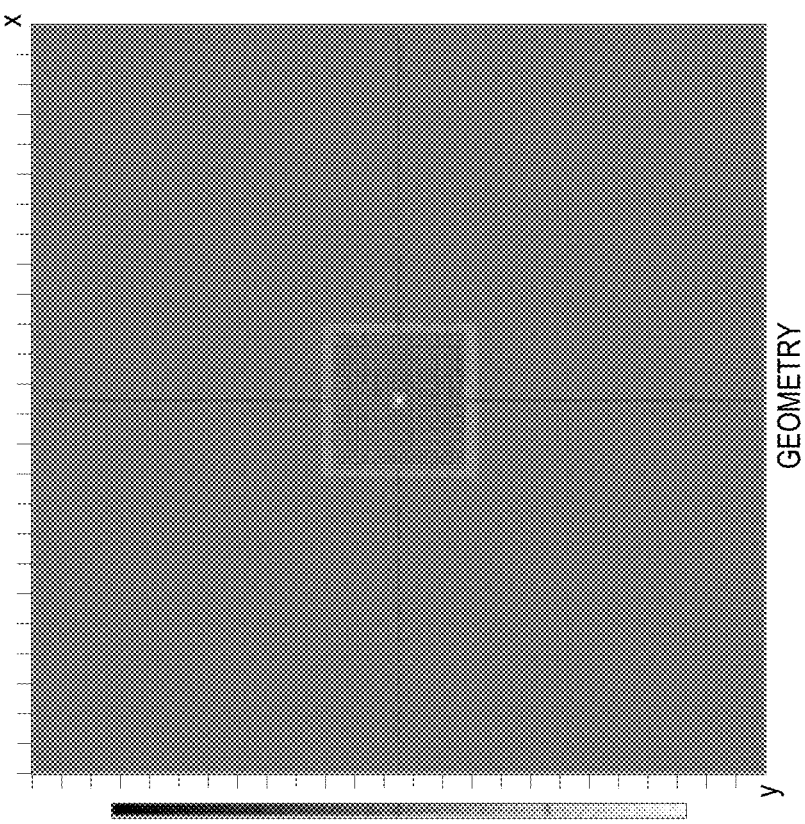

FIGS. 15A-15B illustrate a geometry validation step through forward modeling showing a vertical cross-sectional image for geometry 1400. FIGS. 16A-16B illustrate a geometry validation step through forward modeling showing a horizontal cross-sectional image for geometry 1400. For the validation of the geometry 1400, a similar forward modelling study was performed to virtually image a target at depth of 1800 ft. and at a constant medium velocity of 2000 m/s with a maximum frequency of 200 Hz. The forward modeling result in FIGS. 15A-15B and 16A-16B show concentrated energy plops corresponding to the target at 1800 ft. This validates the geometry 1400 for imaging slightly deeper targets (for example, relative to geometry 1100).

Figure 17:
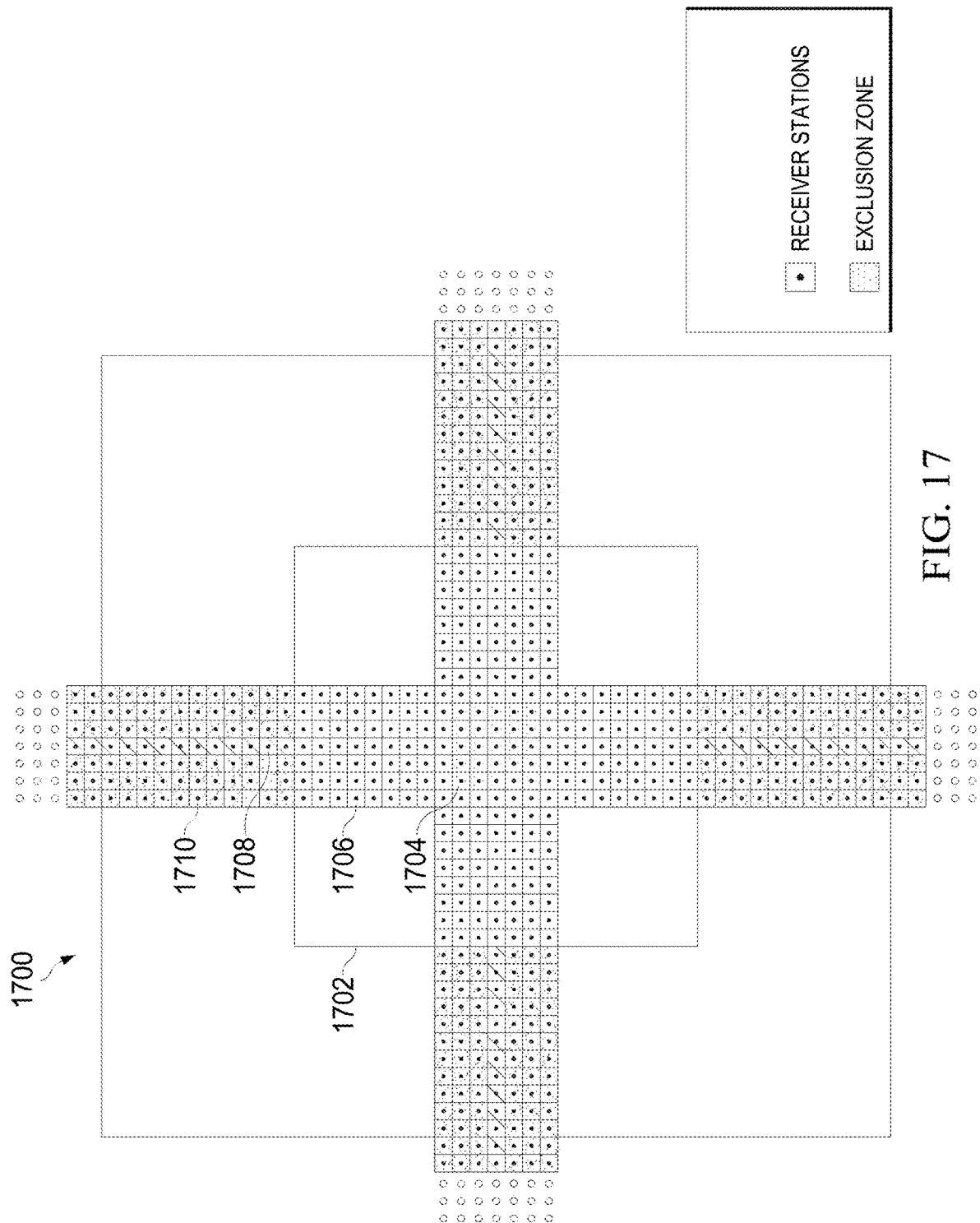
FIG. 17 illustrates an example symmetric acquisition geometry centered on the wellhead and targeting deeper depths according to the present disclosure.

FIG. 17 illustrates a symmetric acquisition geometry 1700 centered on the wellhead and targeting deeper depths. The geometry 1700 targets deeper depths of over 500 m and up to 3000 m. Geometry 1700 is also a hybrid combination of 2D components centered around the wellhead. Compared to the geometries 1100 and 1400, the main component of this geometry 1700 consists of two thick 2D lines with multiple (for example, seven in this example) receiver lines each crossing at the wellhead and extending outward by slightly more than 2 km from the center to better image the far field energy generated by deeper targets.

Figure 18B:
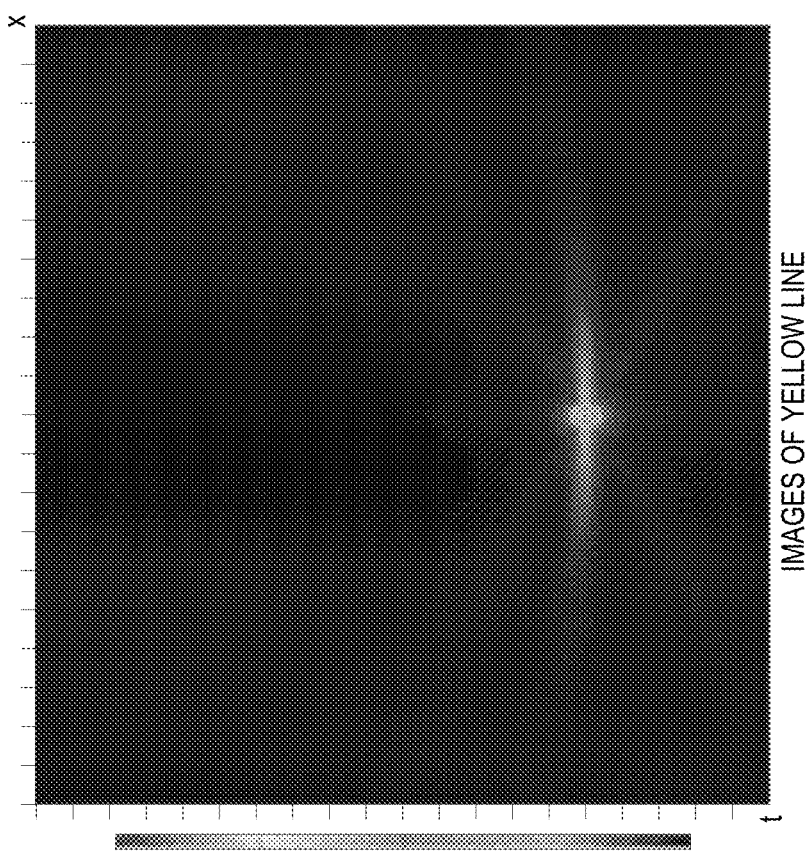
FIGS. 18A-18B illustrates an example third geometry validation step through forward modeling showing a vertical cross-sectional image according to the present disclosure.
Figure 18A:
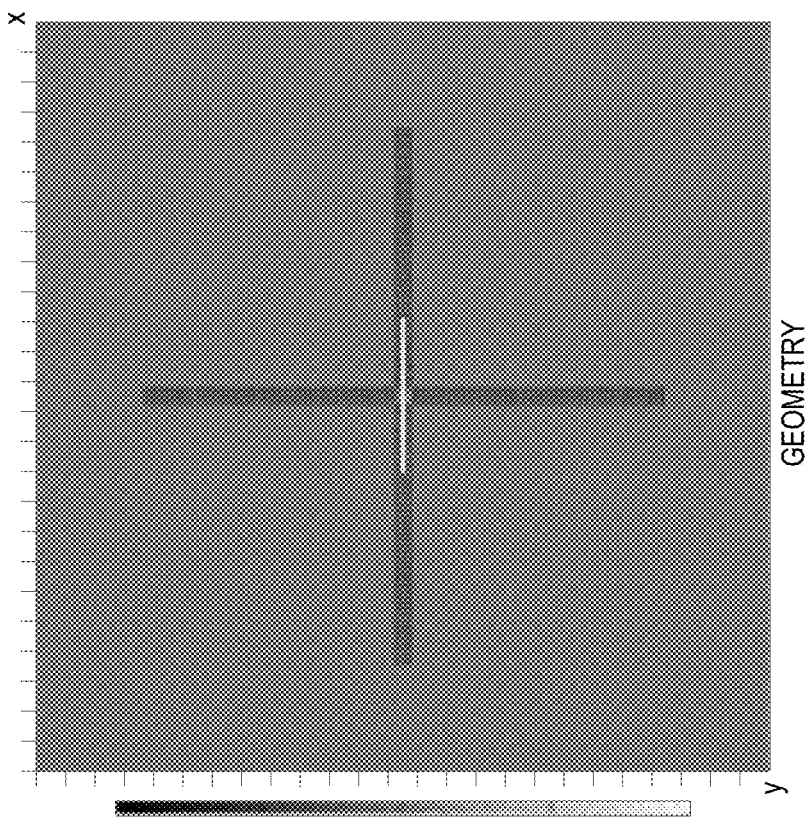
Figure 19B:
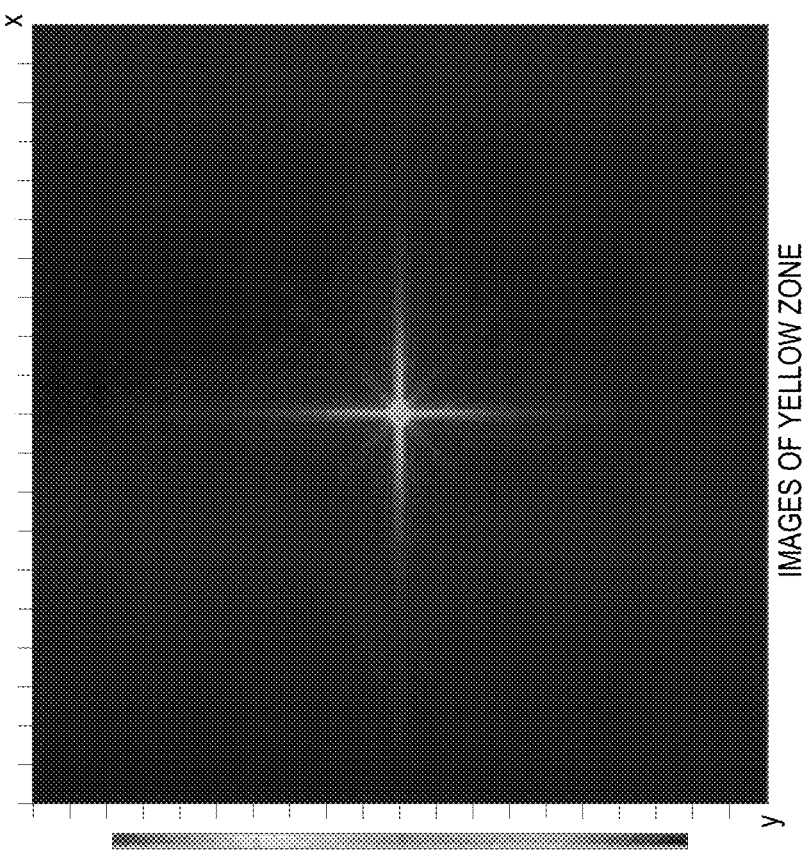
FIGS. 19A-19B illustrates the third geometry validation step through forward modeling showing a horizontal cross-sectional image according to the present disclosure.
Figure 19A:
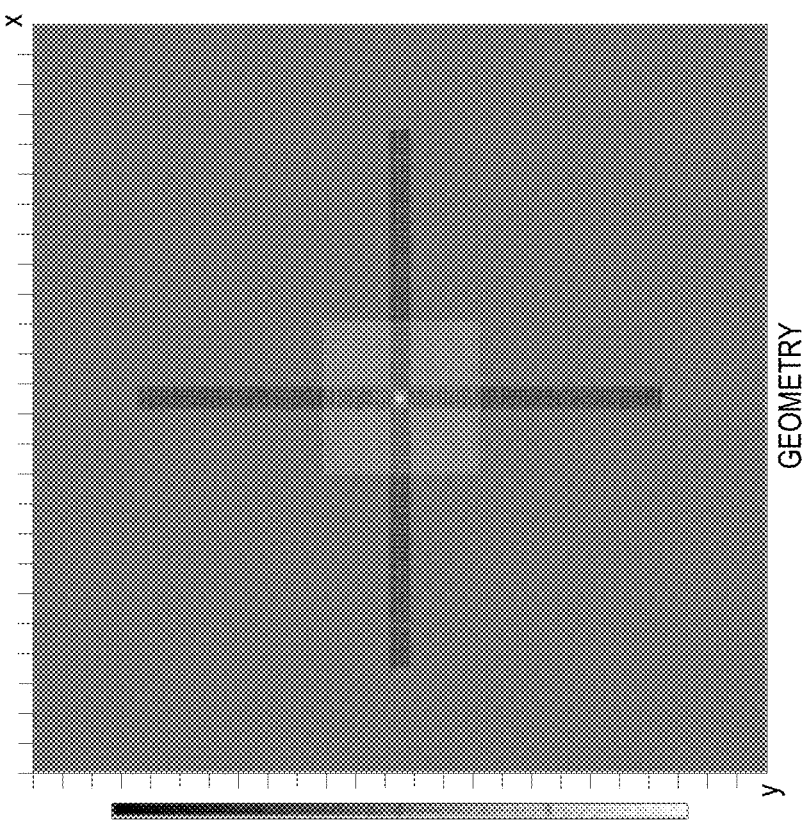

FIGS. 18A-18B illustrate a geometry validation step through forward modeling showing a vertical cross-sectional image for geometry 1700. FIGS. 19A-19B illustrate geometry validation step through forward modeling showing a horizontal cross-sectional image for geometry 1700. For the validation of the third geometry, a similar forward modelling study was performed to virtually image a target at depth of 5000 ft. and at a constant medium velocity of 2000 m/s with a maximum frequency of 200 Hz. The forward modeling result in FIGS. 18A-18B and 19A-19B show concentrated energy plops corresponding to the target at 5000 ft. This validates the third geometry for imaging deeper targets (for example, relative to geometry 1100).

Figure 20:
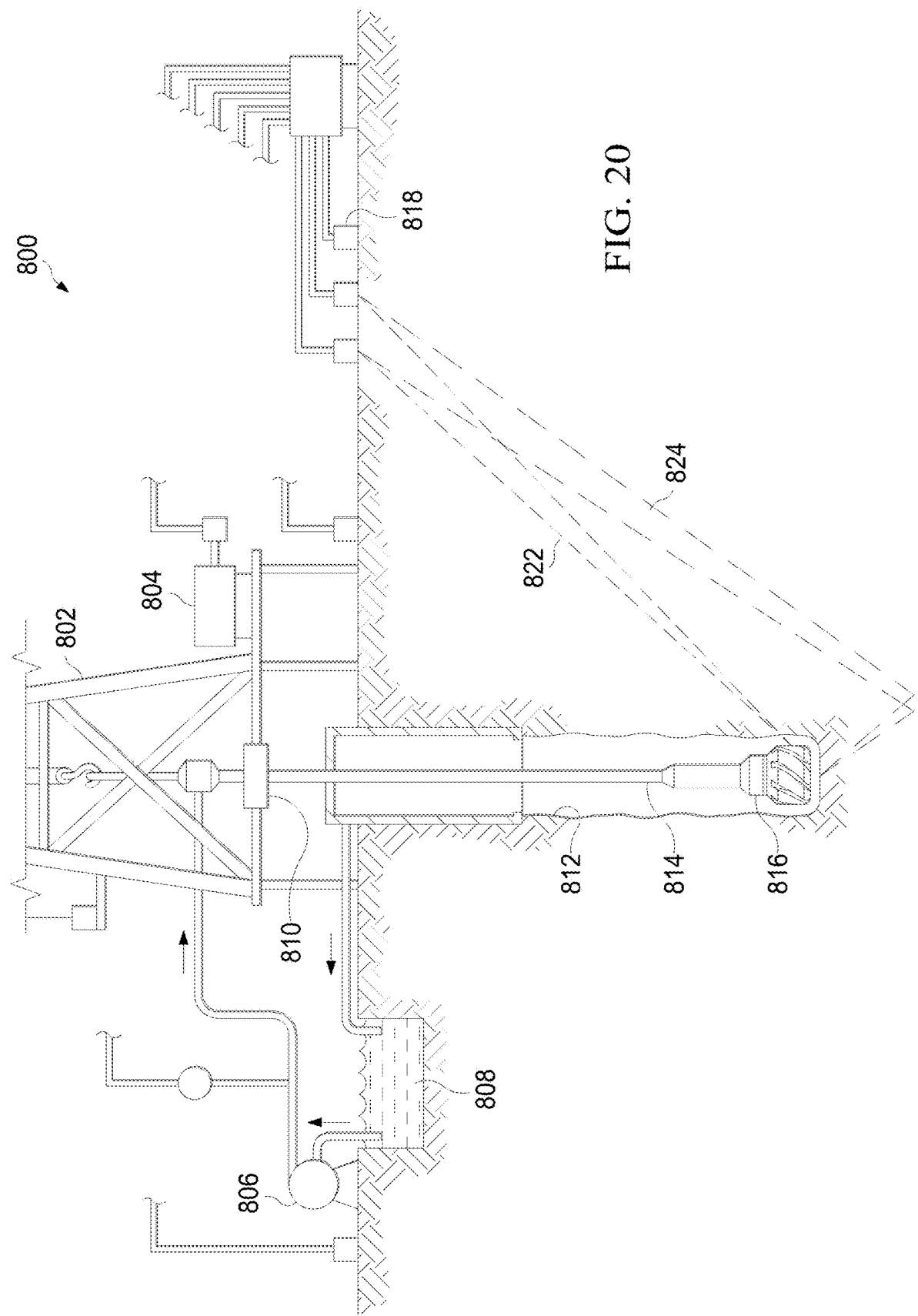
FIG. 20 illustrates the example implementation of a SWD system of FIG. 8 with possible locations of extra acoustic sensors at the rig site.

FIG. 20 illustrates the example implementation of a SWD system 800 of FIG. 8 with possible locations of extra acoustic sensors. As shown in FIG. 20, SWD system 800 includes the drilling derrick 802 that operates to drive the rotary table 810 with the electric motor 804 to form wellbore 812 with the drilling bit 816 coupled to the drilling string 814. The drilling mud is pumped by the mud pump 806 from the mud tank 808 through the drilling string 814 to, for example, exit the drilling bit 816 and remove cuttings back to the terranean surface on which the derrick 802 sits. As shown, geophones 818 (acoustic sensors) are mounted on the terranean surface to receive acoustic signals from the drilling bit 816 and other components of the system 800. Such signals include direct signals 820 emitted from casing joints, direct signals 822 emitted from the drilling bit 816, and reflected signals 824 emitted from the drilling bit 816.

In the execution process, and in preparation for seismic data acquisition or collection, the illustrated equipment of FIG. 20 are taken to the field or the drilling rig site to layout the designed acquisition geometries or patterns on the surface around the drilling rig 802. These sensors (for example, geophones 818) record seismic signals transmitted and reflected from the drilling bit 816 and drilling string 814 travelling through subsurface formations. The drilling rig and drilling site are also instrumented with sensors to record pilot signals (drill-bit signature) and surface noises due to drilling activities. These recorded signals by surface sensors carry the signatures of the earth formations and the drill bit vibrations. These two signatures can be split by cross-correlations or other methods using the recorded pilot signals by surface sensors near the drilling string entry point to the ground. Similarly, the drilling activity noises are decoded out of the recorded signals.

Figure 21:
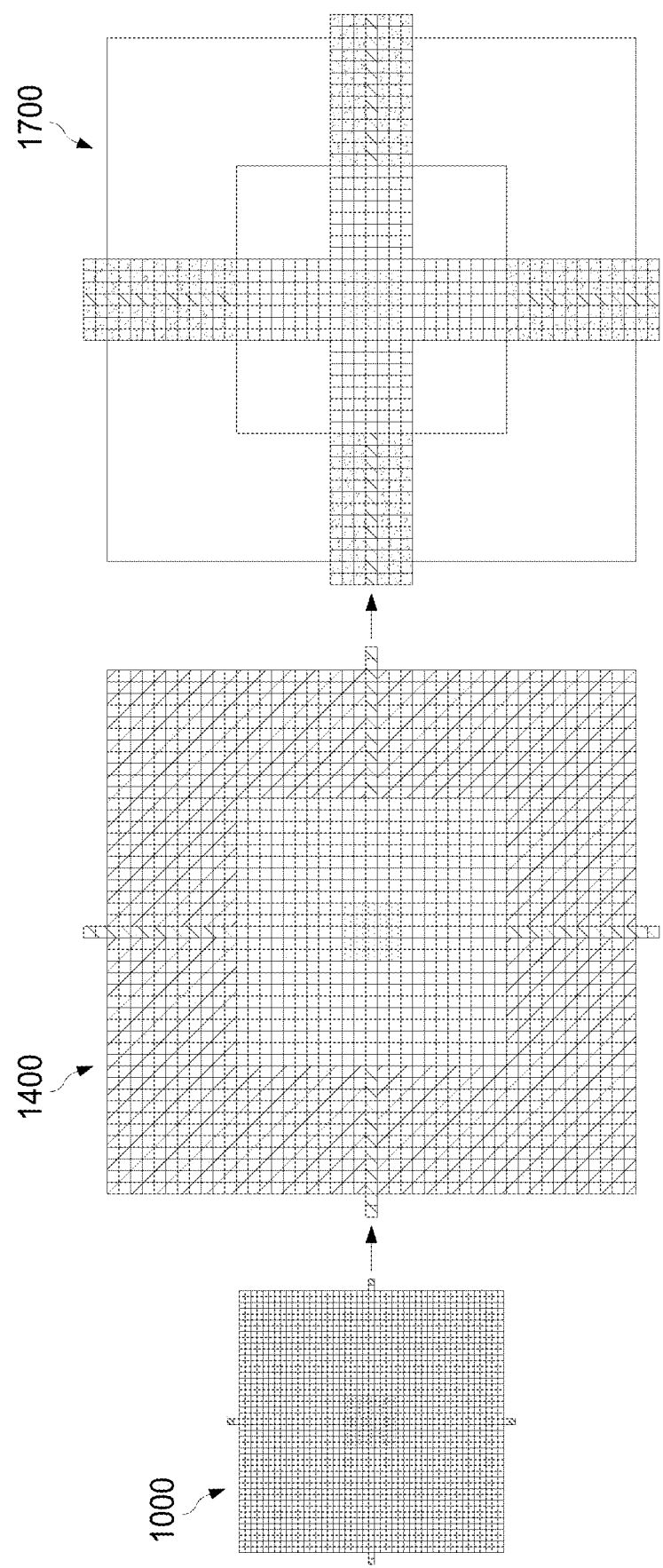
FIG. 21 illustrates example different acquisition geometries based on different depth ranges according to the present disclosure.

FIG. 21 illustrates different acquisition geometries 1000, 1400, and 1700 based on different depth ranges. Once the SWD system 800 are instrumented, it can be unchanged throughout each field deployment. The layout of the surface seismic sensors can take place simultaneously starting with the smallest coverage pattern targeting shallow drilling depths. Once this initial pattern or geometry is placed, recording starts by the start of drilling until a certain drilling depth. Beyond this depth, this initial geometry (geometry 1000) may not be able to record focused signals, thus, may be updated. The geometry 1400 then targets a deeper drilling depth range. The geometry 1400 may also record while drilling takes place through the second drilling depth range after which it will record unfocused signals again and will be due for a second update again. The geometry update takes place during drilling down time and goes on repeatedly until a maximum drilling depth is reached. The geometry update can be based on drilling depth ranges as explained simplifying the data acquisition process (as in FIG. 21) or can be changed adaptively based on signal focusing. The use of wireless seismic systems especially those with radio communication may provide flexibility to the sensors deployment enabling execution of such field operation swiftly.

Figure 22:
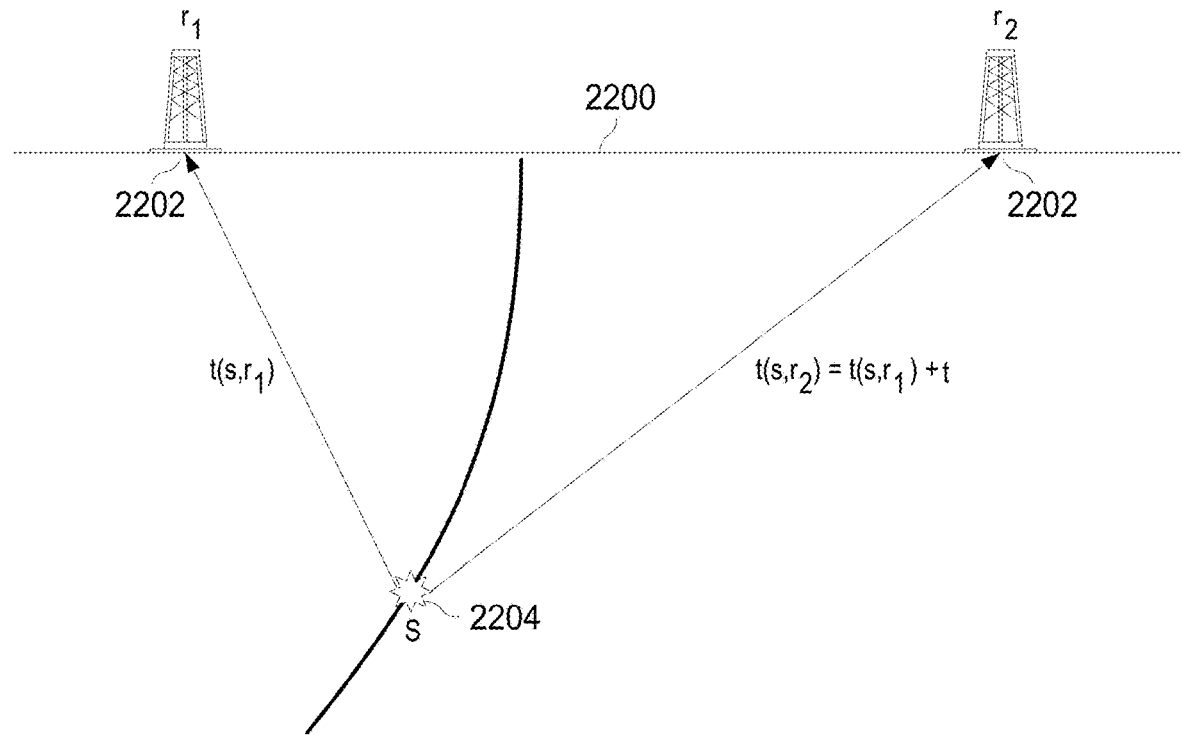
FIG. 22 illustrates an example schematic of travel-time difference with a pair of two receivers and a downhole passive source according to the present disclosure.

FIG. 22 illustrates a schematic of travel-time difference with a pair of two receivers (2202) positioned on a terranean surface 2200 and a downhole passive source 2204 (for example, the drilling bit of the SWD system 800). The use of large scale flexible acquisition geometries for seismic while drilling may allow for a more precise determination of drill bit location using the travel-time difference method. The main advantage of using a large number of receivers is the unlimited possibility to use multiple combinations of receivers to validate the same goal and increase the signal to noise ratio. The schematic shown in FIG. 22 shows a basic case involving a pair of surface receivers 2202, $r_1$ and $r_2$, a drill bit source 2204, S, located at (x, z) along the well path, where x is the surface projection of S and z is the depth of S. The energy being emitted by the drill bit source 2204 is received by each receiver 2202 at two different times sharing a common travel-time component and differ by which is the travel-time difference.

The imaging condition to locate the drill bit location using the travel-time difference for a pair of surface receivers is defined by the formula:

$$s(x,z) = \int g(r_1,x,z,t) g(r_2,x,z,t+\tau) dt \qquad \text{Eq. (1)},$$

where g(r, x, z, t) is a Green Function from any receiver, r, to a specific drill bit location at (x, z) and τ is the travel-time difference.

Figure 23:
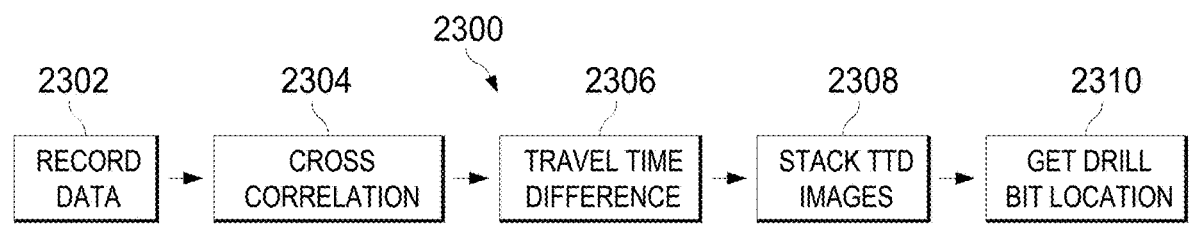
FIG. 23 illustrates an example workflow for drill bit location using cross-correlation and travel-time difference according to the present disclosure.

FIG. 23 illustrates an example workflow 2300 for drill bit location using cross-correlation and travel-time difference. As shown, for example, workflow 2300 includes a first step 2302 in which the seismic data is recorded passively. Next, in step 2304, the recorded data is then cross-correlated with a reference or pilot traces allowing the energy to be focused on useful signal and not the noise. Next, in step 2306, the drill bit location is determined using multiple pairs of receivers and references using the imaging condition stated previously. This provides multiple realizations of the drill bit location. Next, in step 2308, the travel-time difference images are stacked together. In step 2310, these realizations pin point the drill bit location.

Figure 24:
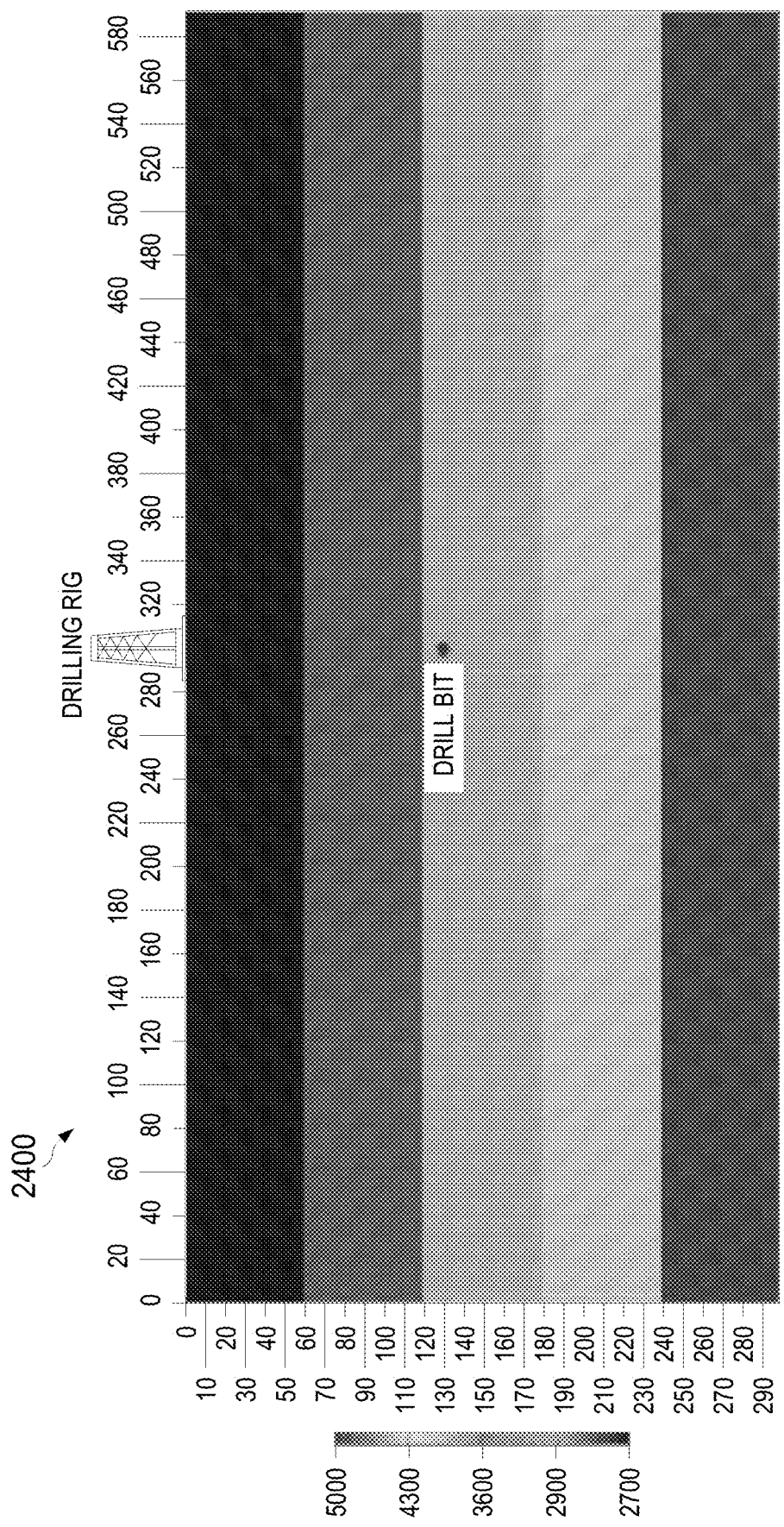
FIG. 24 illustrates an example simple layer earth model according to the present disclosure with the identified drill bit location.

FIG. 24 illustrates a simple layer earth model 2400. For example, to demonstrate the concept of using large scale acquisition geometries, the simple layer 2D earth model 2400 is used and a vertical well trajectory is assumed. Further, it is given that seismic is recorded using an acquisition geometry covering the surface at uniformly spaced receivers and centered around the drilling rig. The use of a large number of receivers allows for the use of cross-correlation and travel-time difference for each receiver pairs.

Figure 25:
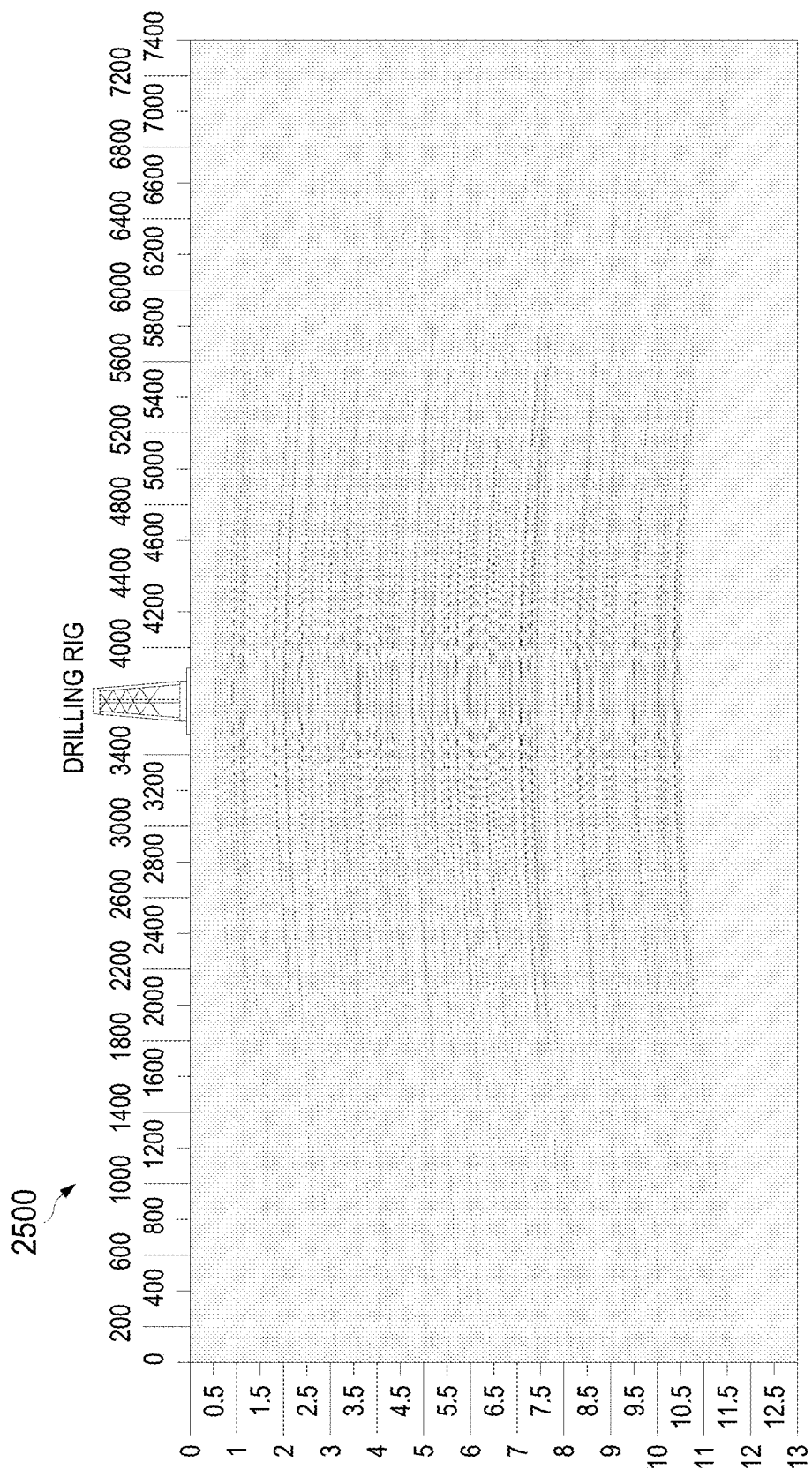
FIG. 25 illustrates an example graph of recorded seismic while drilling according to the present disclosure.
Figure 26:
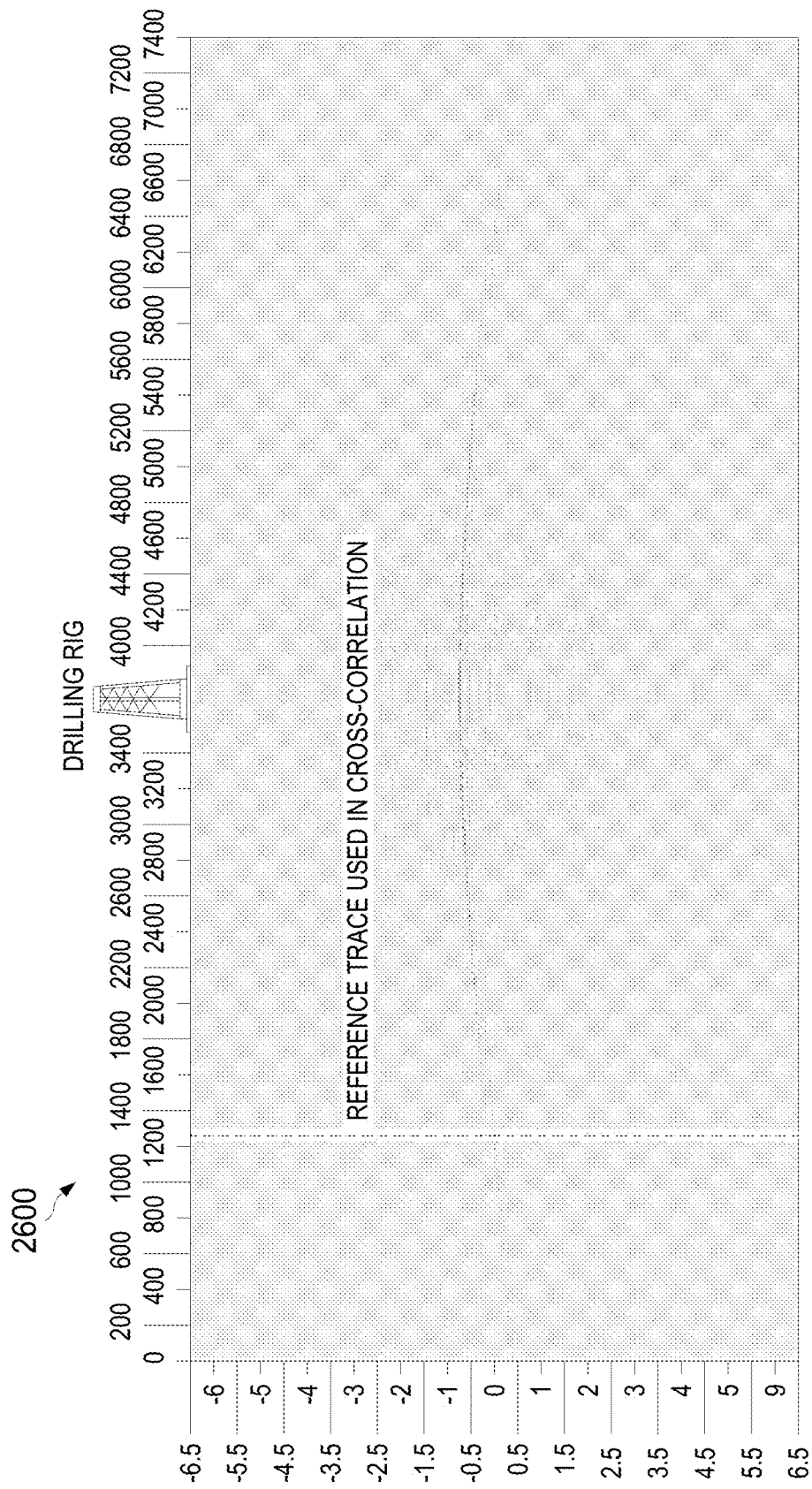
FIG. 26 illustrates an example graph of cross-correlating using a reference at a receiver, $r_1$, according to the present disclosure.
Figure 27:
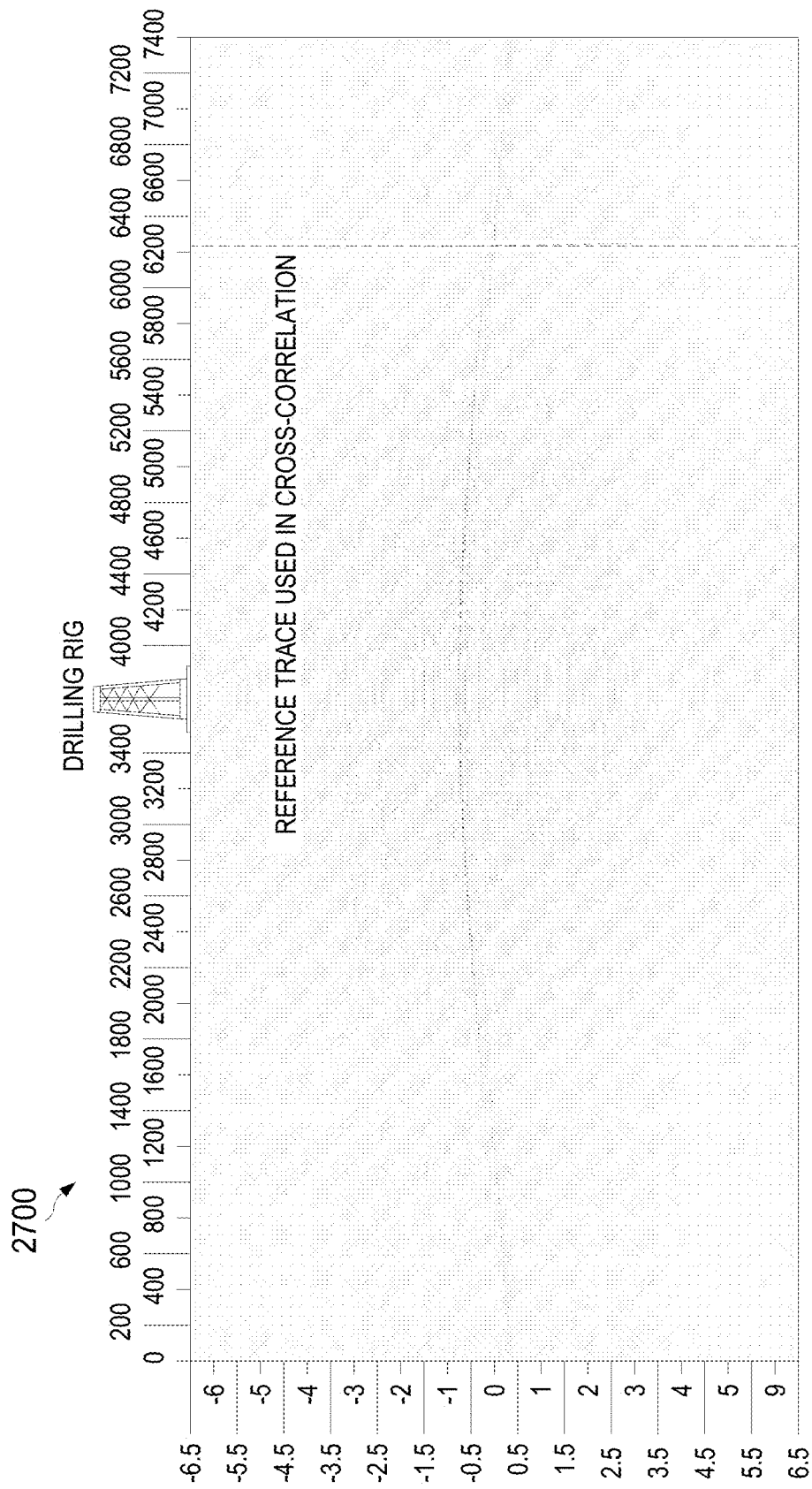
FIG. 27 illustrates an example graph of cross-correlating using a reference at a receiver, $r_2$, according to the present disclosure.

FIG. 25 illustrates a graph 2500 of recorded seismic while drilling through the model 2400. When recording seismic while drilling, a drill bit recorded signal using all surface receivers would be as shown in the graph 2500 of FIG. 25, which shows recorded seismic data (from the drilling bit as the passive source) at distances away from the drilling rig (on the x-axis) in time (on the y-axis). FIG. 26 illustrates a graph 2600 of cross-correlating using a reference at a receiver, $r_1$ (as shown in the schematic of FIG. 22). FIG. 27 illustrates a graph 2700 of cross-correlating using a reference at a receiver, $r_2$ (as shown in the schematic of FIG. 22). For all combinations of receiver pairs, a reference signal is used for the cross-correlation process resulting in many cross-correlated signals.

Figure 28:
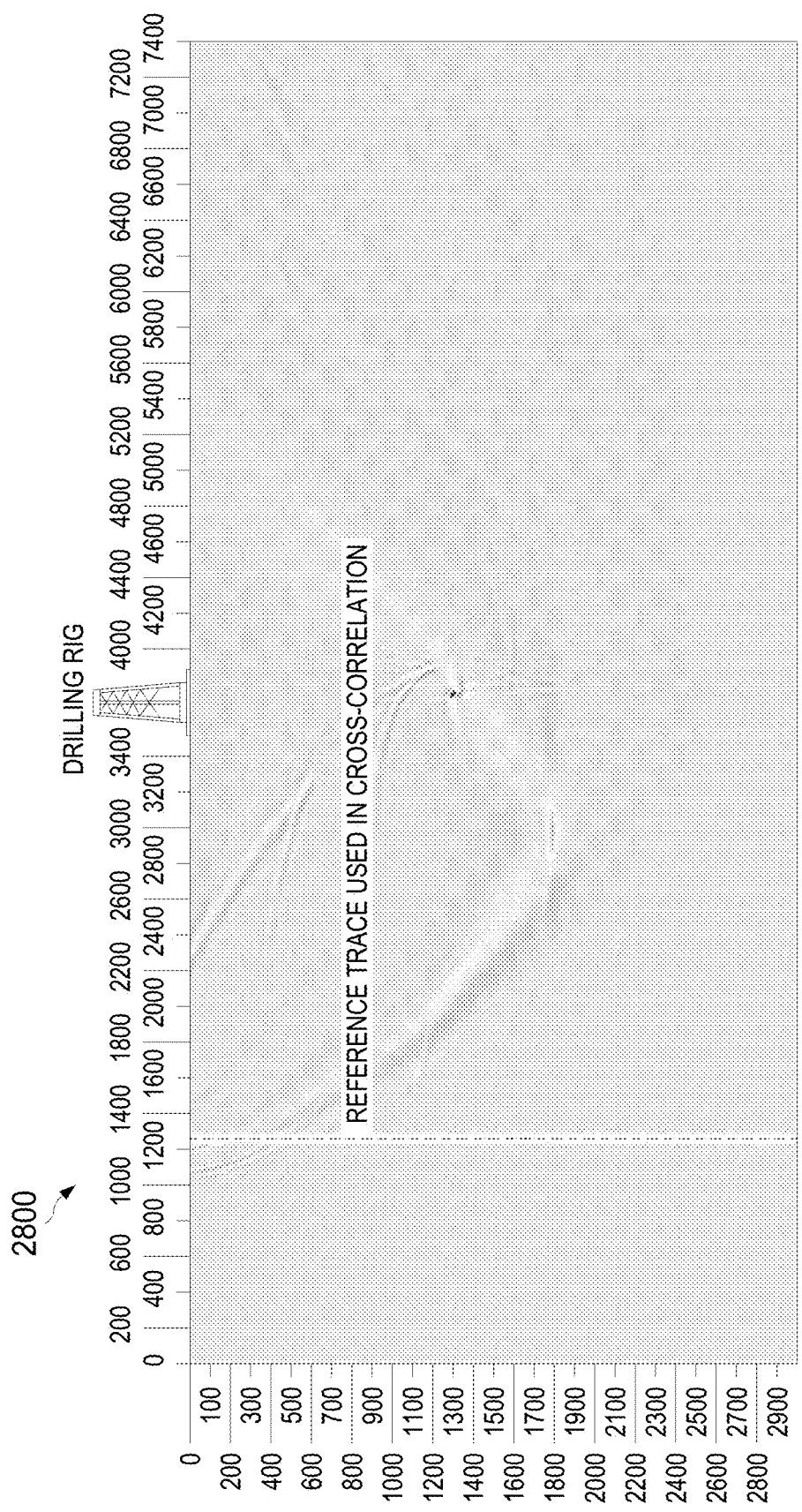
FIG. 28 illustrates an example graph of travel-time difference imaging after cross-correlation using reference at a receiver, $r_1$, according to the present disclosure.
Figure 29:
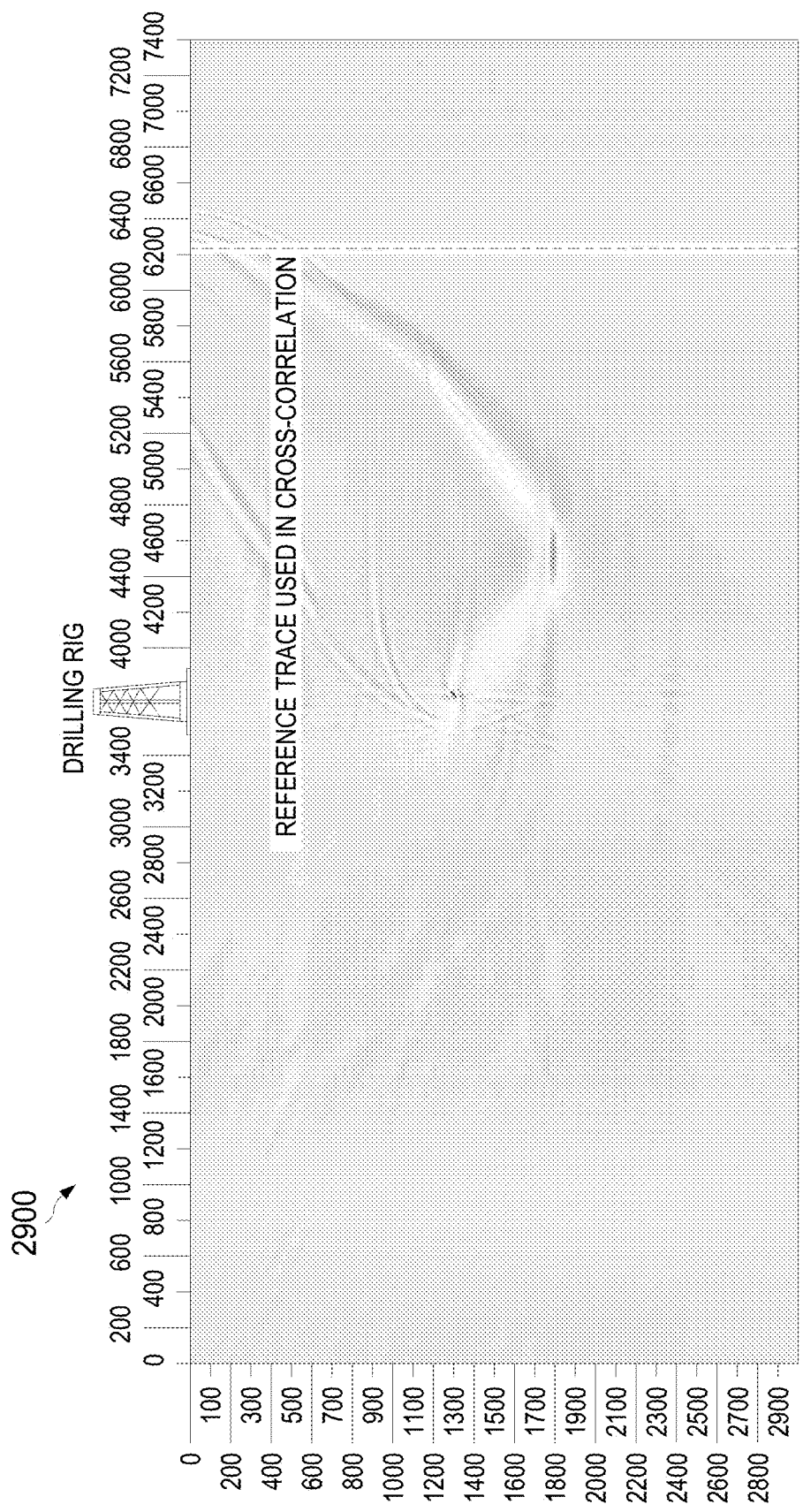
FIG. 29 illustrates an example graph of travel-time difference imaging after cross-correlation using reference at a receiver, $r_2$, according to the present disclosure.
Figure 30:
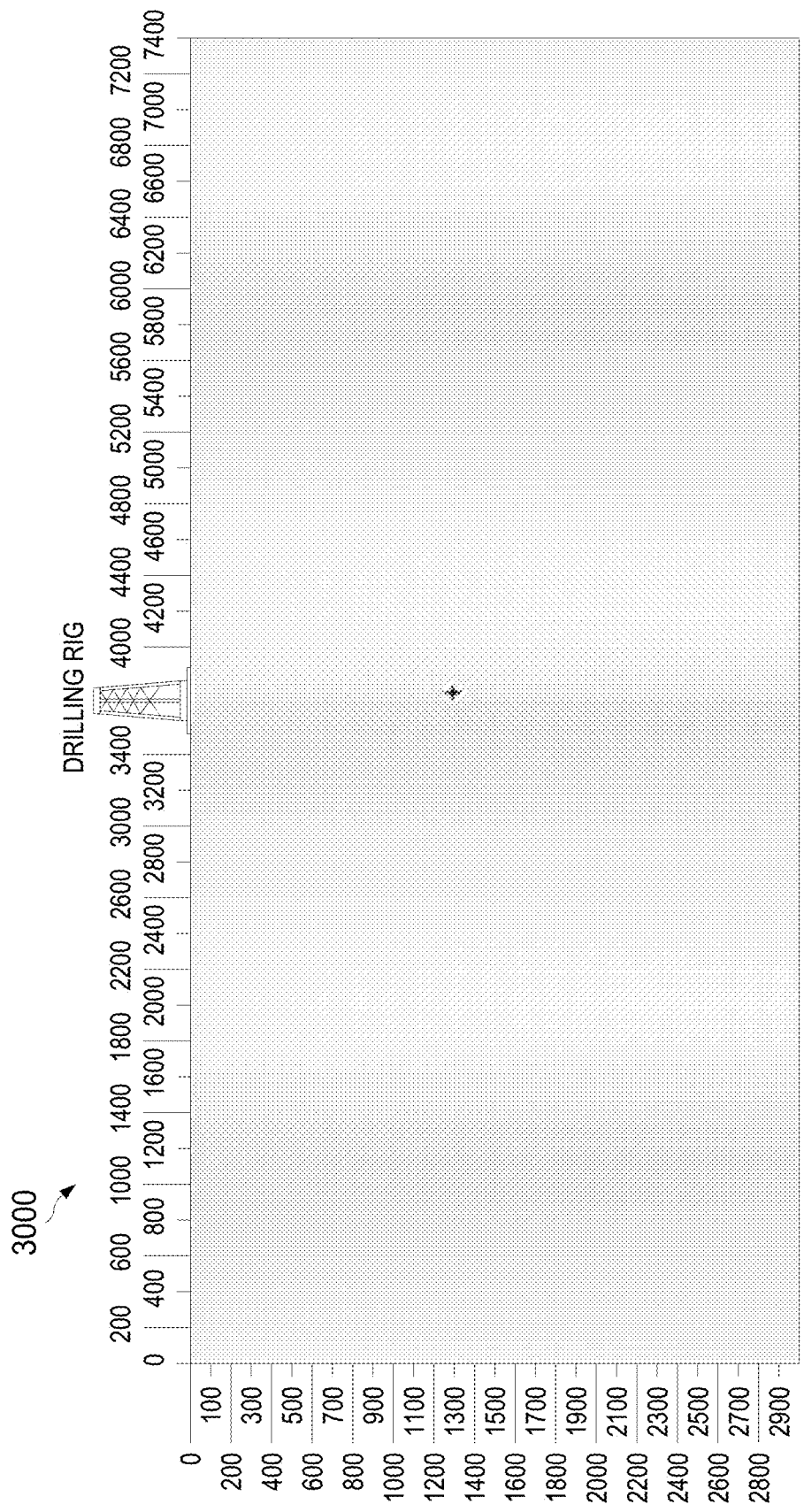
FIG. 30 illustrates an example graph of stacked images revealing the drill bit location according to the present disclosure.

FIG. 28 illustrates a graph 2800 of travel-time difference imaging after cross-correlation using reference at a receiver, $r_1$. FIG. 29 illustrates a graph 2900 of travel-time difference imaging after cross-correlation using reference at a receiver, $r_2$. FIG. 30 illustrates a graph 3000 of stacked images revealing the drill bit location. These cross-correlated signals are then used to image the drill bit location using the travel-time difference method for each receiver pair.

In some aspects, these images still contain imaging artifacts. The resulting images are then stacked together to generate a more defined image of the drill bit location by eliminating the imaging artifacts. Without the use of a large number of receivers, the process of locating the drill bit would be inaccurate and nearly impossible using cross-correlation and travel-time difference. In the above theoretical demonstration, the drill bit location was determined in the vertical section 2D plain because of assuming receivers on a 2D line at the surface. The use of 3D acquisition geometries extends the possibility of locating the drill bit in three dimensions.

Similarly, the use of a large number of receivers allows for imaging and prediction ahead of the drill bit. A large number of receivers also allows for better sampling and recording of different seismic waves. In particular, a new type of body wave can now be recorded while drilling. These body waves are usually generated by tube wave in the wellbore which originate by drill string movements in the wellbore. Such body waves are revealed using conventional passive seismic imaging methods from the low signal-to-noise ratio (S/N) field data.

One more possible application that is enabled by the use of large number of receivers is seismic logging while drilling. Another possible application that is also enabled by use of large number of receivers placed on the surface around the wellhead is the recording of reverse vertical seismic profiles (VSPs). In a conventional VSP setting, an active seismic source is used to generate seismic signals at different locations on the surface while a group of receivers are lowered into the wellbore at different depth levels to record seismic reflections around the wellbore. On the other hand, a reverse VSP would use the drill bit as a passive source and the surface receivers as detectors. The number of receivers suggested in SWD recording outnumbers the number of receivers in a conventional VSP which does not exceed a 100 receivers at a time. This allows for better recording and detection of seismic signals in noisy environments.

VSP while drilling (VSP-WD) is an emerging technology that can decrease the drilling risk with much lower costs. But since VSP-WD uses active seismic sources on the surface and receivers inside the wellbore, it slows down the drilling operations and the data gathered can be difficult to interpret in real time.

SWD incorporates seismic techniques while a drill string is lowered in to the borehole, during effective drilling, during maneuvers, and while connecting drill pipes. There are two SWD techniques. The first is drill-bit SWD, which records seismic noise generated by the drill bit under effective drilling on the surface seismic sensors. The second is VSP-WD, which records seismic signals generated by a surface seismic source and seismic receivers inside the borehole. In both techniques, the number of receivers is limited to maximum of 100 receivers and active sources are used on the surface. This in turn results in data recorded at a lower signal to noise ratios and in additional time delays to drilling operations due to the intervening natures of these technologies.

In contrast, the present disclosure describes a SWD system in which a large number of receivers (for example, much greater than 100) with limitless geometry setting options without the use of active seismic sources and without interrupting the drilling operations is implemented. In this disclosure, the concept is demonstrated using a SWD field experiment using a fixed array geometry (for example, as shown in FIG. 17) consisting of a thousand receiver points with generally circular shape, in an example implementation. In this implementation (and as field-experimented), the well location is 2.6 km away from the center of the receivers spread. Historically, the roller bit is considered to be a good passive source for SWD since it is naturally noisy when crushing rocks. However, most drilling operations today use polycrystalline diamond cutter (PDC) drill bits that shear rocks. PDC bits are generally quieter than roller bits and are challenging passive sources for receivers on the surface. For this reason, other mechanics of downhole sources generated by the movement of drill strings are explored. To locate the sources of seismic waves recorded by the geophones, the following passive seismic imaging condition are used:

$$I(x) = \Sigma_t u^2(x,t) \qquad \text{Eq. (2),}$$

where I(x) is the imaging condition at a receiver position (x) and u(x, t) is the receiver wavefield reconstructed by the formula:

$$u(x,t) = F^{-1}[\Sigma_{x_r} D(x_r,\omega) G^*(x_r,x,\omega)] \qquad \text{Eq. (3),}$$

where $D(x_r, \omega)$ is the recorded data at the receiver position, $x_r$, after Fourier transform, *, is the complex conjugate and $G(x_r, x, \omega)$ is the frequency-domain Green's Function. Green's function can be approximated using a finite-difference or other numerical method to solve the wave equation, for example, the ray-based method.

The reconstructed wavefield is calculated using Eq. (3), making it easier to observe seismic waves coming from the underground sources. After locating the source using Eq. (2), the position of the located source is shallower than the true drill bit depth. However, the locations of the sources are consistent with where velocity contrast is the greatest. Hence, the received body waves come from secondary sources, which are converted from tube waves in the wellbore. Wave mode conversion happens at locations where large velocity contrasts exit or at some discontinues or density anomalies in casing or wellbore formation (for example, perforations, drill string locks, packers). On the other hand, tube waves in the wellbore are related to the movement of drill strings, vibration of the drill bit, and other drilling activities.

Taking the source location, $x_s$, as a reference image point, the time series, $u(x_s, t)$, can be determined and a time-frequency transformation can be applied on the time series. Once this is compared with the drilling activities, it is determined that the time series is consistent with the drilling activities. From the analysis of reconstructed wavefields, source imaging and time series at the source location, it can be concluded that the recorded seismic waves, mainly body waves generated by tube waves, appear to be useful for SWD.

For the validation process of different acquisition geometries, the focal beam approach can be used. This method utilizes migration as the double focusing process where source and receiver fields can be focused separately for a given velocity model. In turn, this reveals the required amplitude accuracy, offset and azimuth coverage and spatial resolution of a specific field geometry. This double focusing approach can be done separately for each specific frequency and at each target diffraction point at a given location. In some aspects, the same velocity model as is used in depth for the drill bit imaging, and the target point is assumed as the projection of the well head to the target horizon or target depth. In some aspects, the source is always a single point associated to the drill bit location and the receiver arrays are on a fixed layout that is subject to this analysis prior to being modified for different target depths. The results of such analysis obtained in real time allow to evaluate current seismic geometry in terms of resolution and amplitude coverage and propose a new acquisition geometry based on changing source depth.

Figure 31:
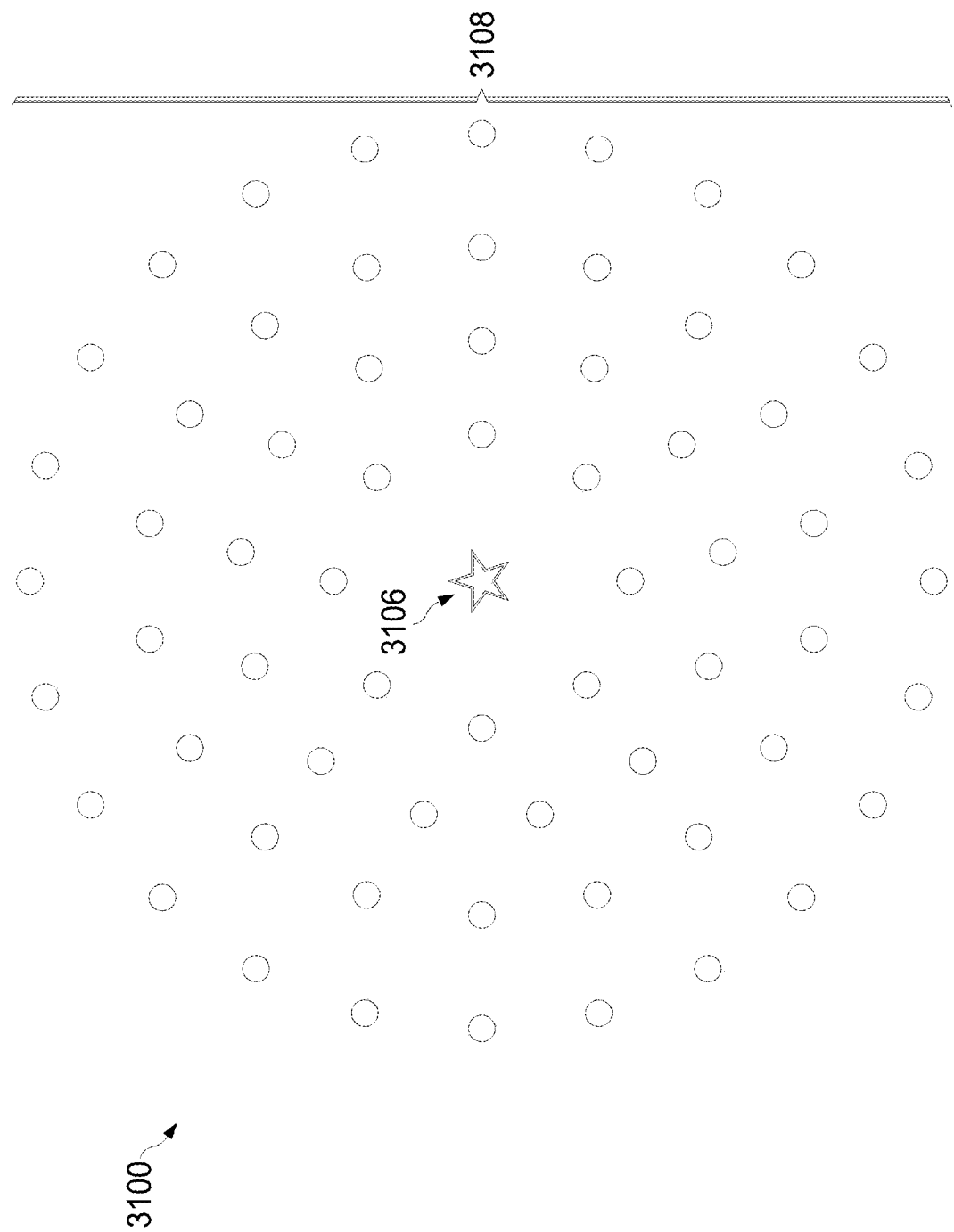
FIG. 31 illustrates an example graph of field test acquisition geometry and well location according to the present disclosure.

FIG. 31 illustrates a graph 3100 of a field test acquisition geometry 3108 and well location 3106. As described previously, an initial field experiment was conducted to record passively seismic while drilling using a fixed geometry consisting of a thousand receiver points with generally circular shape as shown in FIG. 31. In this experiment, the well location is 2.6 kilometers away from the center of the receivers in the particular geometry.

Figure 32:
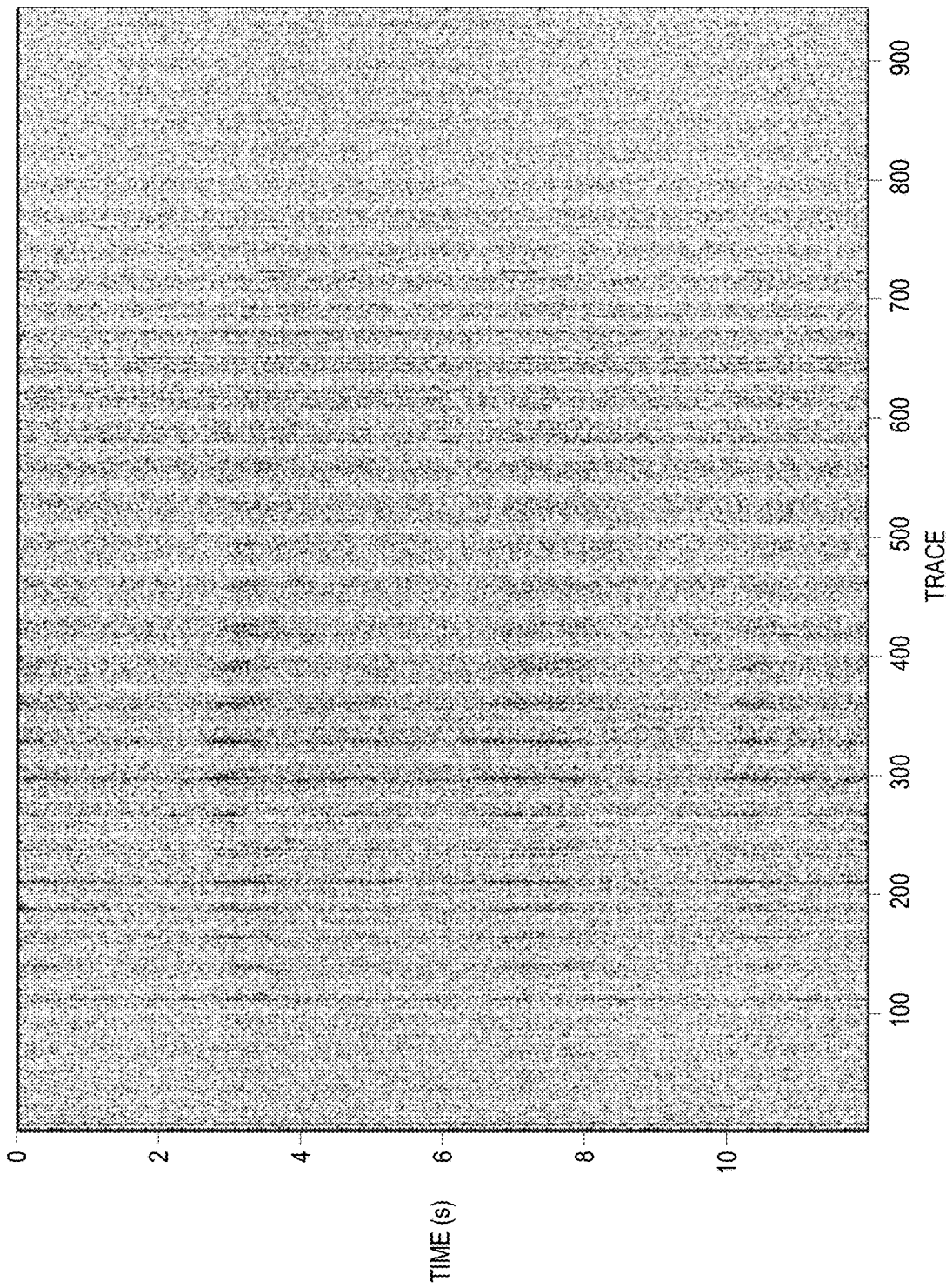
FIG. 32 illustrates an example graph of raw recorded passive seismic data without any pre-processing applied according to the present disclosure.

FIG. 32 illustrates a graph 3200 of raw recorded passive seismic data without any pre-processing applied for the field experiment. Graph 3200 includes an x-axis that describes a trace of the raw recorded data and a y-axis that describes time (in seconds) of the raw data. The graph 3200 of FIG. 32 shows 12 seconds of raw recorded passive seismic data without any pre-processing applied.

Figure 33:
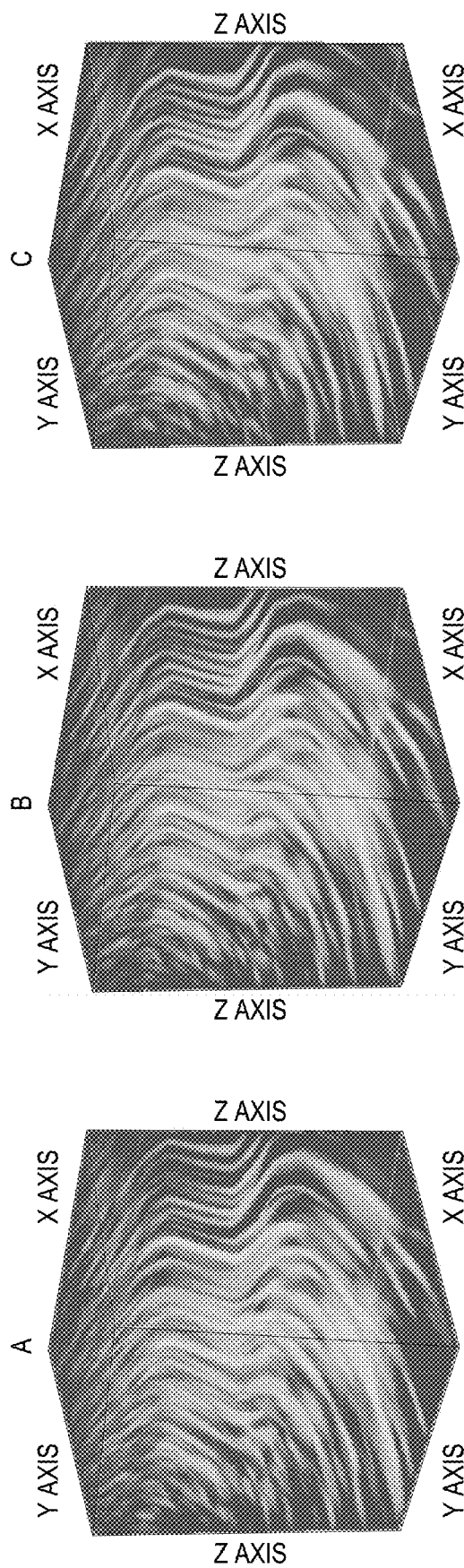
FIG. 33 illustrates example graphs of reconstructed wavefields at different times according to the present disclosure.

FIG. 33 illustrates graphs (a, b, and c) of reconstructed wavefields at different times from the raw recorded data of FIG. 33. In FIG. 33, three different time snapshots of seismic waves recorded using the field passive seismic setup in FIG. 32 are shown in portions (a), (b), and (c). As shown, portion (a) shows the wavefield at a time (T); portion (b) shows the wavefield at T+0.04 seconds; portion (c) shows the wavefield at T+0.08 seconds. From these three reconstructed wavefield snapshots, it can be inferred that the seismic waves propagate from the wellbore to the seismic sensors on the surface.

Figure 34B:
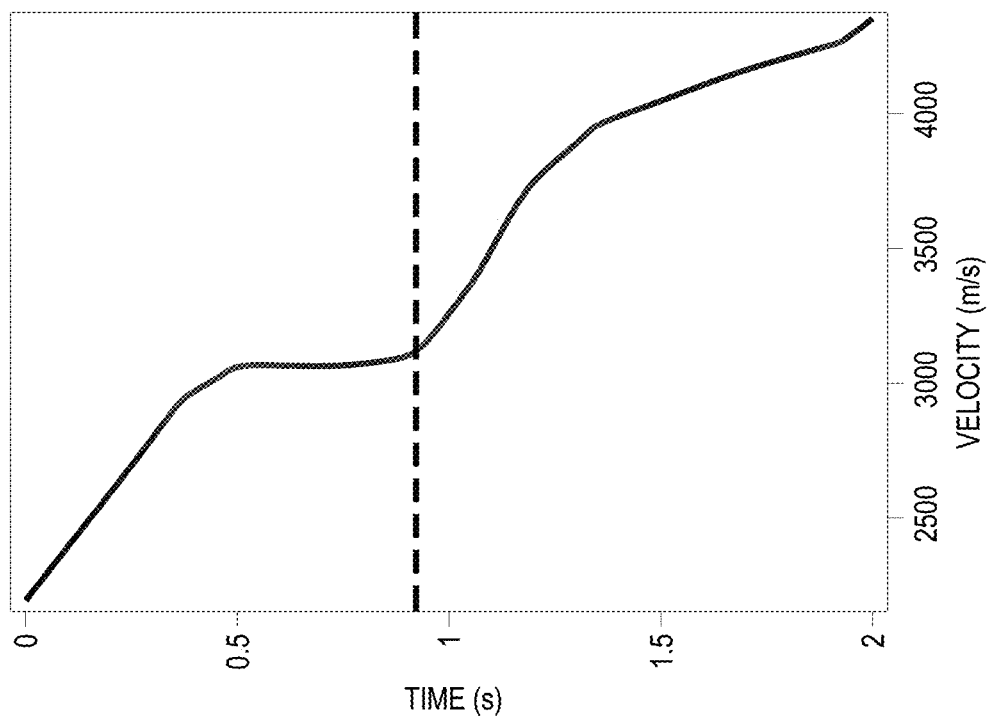
FIGS. 34A-34B illustrate graphs of an image of a secondary energy source and location of drill bit and a stacking velocity curve according to the present disclosure.
Figure 34A:
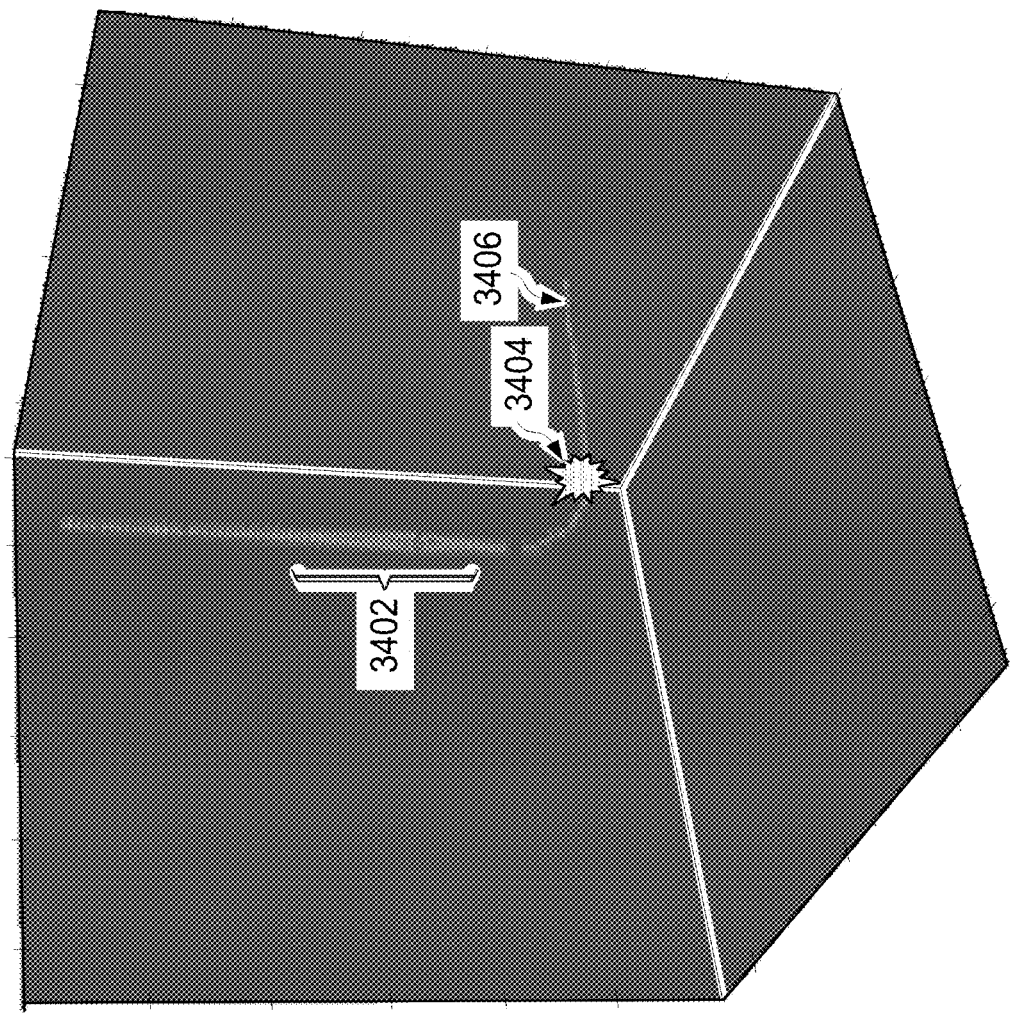

FIGS. 34A-34B illustrate graphs of an image of a secondary energy source and location of drill bit and a stacking velocity curve. For example, FIG. 34A shows an image of a secondary energy source and location of drill bit. Here, dots 3402 denote the image around the secondary source, the dot 3404 denotes the true location of the drill bit, and the dots 3406 denote the well path. FIG. 34A shows a stacking velocity curve. Here, the horizontal dotted line denotes the pseudo-depth (time) position of the secondary energy source.

Figure 35:
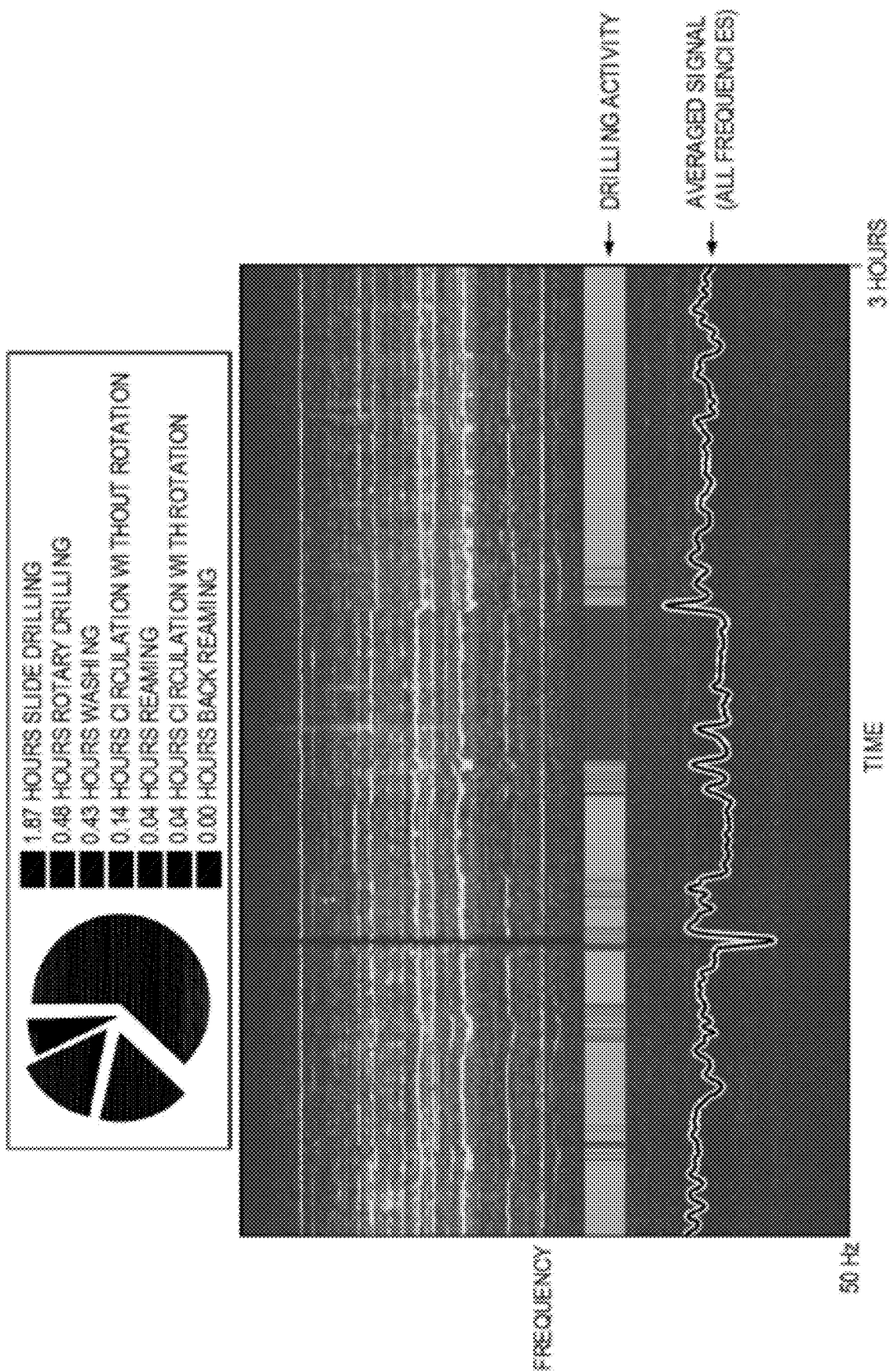
FIG. 35 illustrates graphs of time-frequency analysis of the recorded and processed passive seismic data according to the present disclosure.

FIG. 35 illustrates graphs of time-frequency analysis of the recorded and processed passive seismic data. For example, a time frequency analysis was performed on the recorded passive data. The data spans a recording period of three hours and shows excellent correlation between the time-frequency responses and the drilling activities. In some aspects, for instance, seismic logging while drilling techniques can be used to extract time series at the source location and predict the rock properties in real time by analyzing the correction between the time series and rock properties. For example, a seismic logging while drilling workflow can include the following sequence (in the described order or another order). First, a move-out correction is applied to the observed data, for example, by applying a source-receiver distance dependent time shift to each trace. Second, the corrected (or time-shifted) traces can be stacked into a single trace. In this example, amplitude values of all traces at each time step can be summed together and normalized to provide one supertrace. Third, a time-frequency analysis method (such as short-time Fourier transform) can be applied to the stacked trace. Application of the time-frequency analysis method can result in decomposing the time series within each short-time window into different frequency components. Fourth, rock properties can be predicted from the time-frequency spectrum, for example, by applying machine learning techniques such as a neural network analysis. Primary components needed for predicting the propertied can include data obtained earlier in similar conditions. Fifth, information that includes the predicted knowledge of the geological formation around and ahead of the drill bit (for example, rock hardness, pore pressure, and fractures) can be used to adjust drilling programs in real time. Adjustments made to drilling programs can result in optimizations related to drilling time and costs.

Certain features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as erasable programmable read-only memory (EPROM), electrically erasable programmable read-only memory (EEPROM), solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described may include more steps or fewer steps than those described. Further, the steps in such example operations, methods, or processes may be performed in different successions than that described or illustrated in the figures. Accordingly, other implementations are within the scope of the following claims.

What is claimed is:

1. A method for drilling a wellbore, comprising:
operating a seismic-while-drilling (SWD) system to initiate formation of a wellbore from a terranean surface toward a subterranean zone at a particular depth beneath the terranean surface, the SWD system comprising a passive acoustic energy source that comprises at least a portion of a drilling string and a plurality of acoustic energy receivers positioned at the terranean surface, the plurality of acoustic receivers comprising:
a first set of acoustic energy receivers positioned with a first geometric arrangement on the terranean surface, wherein the first geometric arrangement comprises a first square-shaped ring centered on a wellhead of the wellbore that includes the first set of acoustic energy receivers and a first square-shaped exclusion zone within the first square-shaped ring that excludes the first set of acoustic energy receivers,
a second set of acoustic energy receivers positioned with a second geometric arrangement on the terranean surface different than the first geometric arrangement, wherein the second geometric arrangement comprises a second square-shaped ring centered on the wellhead of the wellbore that includes the second set of acoustic energy receivers and a second square-shaped exclusion zone within the second square-shaped ring that excludes the second set of acoustic energy receivers and comprises an area that encompasses the first square-shaped ring and the first square-shaped exclusion zone, and
a third set of acoustic energy receivers positioned with a third geometric arrangement on the terranean surface different than the first and second geometric arrangements, wherein the third geometric arrangement comprises a cross centered on the wellhead of the wellbore that includes the third set of acoustic energy receivers;

during the formation of the wellbore, recording acoustic signals produced by the passive acoustic energy source with the plurality of acoustic energy receivers, the recording comprising:
   recording a first set of acoustic signals produced by the passive acoustic energy source with the first set of acoustic energy receivers between the terranean surface and a first depth,
   recording a second set of acoustic signals produced by the passive acoustic energy source with the second set of acoustic energy receivers between the first depth and a second depth deeper than the first depth, and
   recording a third set of acoustic signals produced by the passive acoustic energy source with the third set of acoustic energy receivers between the terranean surface and a third depth;
processing the recorded acoustic signals to predict a subterranean location of the passive acoustic energy source; and
based on the predicted subterranean location of the passive energy source, geo-steering the passive acoustic energy source with the SWD system toward the particular depth beneath the terranean surface.

2. The method of claim 1, wherein the passive acoustic energy source comprises a drilling bit and at least a portion of a drill string of the SWD system, and the recorded acoustic signals comprise direct acoustic signals from the passive acoustic energy source and reflected acoustic signals from the passive acoustic energy source.

3. The method of claim 2, wherein the third depth is deeper than the second depth.

4. The method of claim 3, wherein the first depth is at 250 meters, the second depth is at 500 meters, and the third depth is at 1000 meters.

5. The method of claim 1, wherein the third depth is deeper than the second depth.

6. The method of claim 5, wherein the first depth is at 250 meters, the second depth is at 500 meters, and the third depth is at 1000 meters.

7. The method of claim 1, wherein the first geometry covers a first spatial area on the terranean surface, the second geometry covers a second spatial area on the terranean surface larger than the first spatial area, and the third geometry covers a third spatial area on the terranean surface larger than the second spatial area.

8. The method of claim 1, wherein processing the recorded acoustic signals to predict a subterranean location of the passive acoustic energy source comprises:
   cross-correlating the recorded acoustic signals from different ones of the acoustic receivers in the plurality of acoustic receivers;
   determining travel-time difference images of the recorded acoustic signals from the passive acoustic energy source and the different ones of the acoustic receivers in the plurality of acoustic receivers; and
   stacking the travel-time difference images.

9. A seismic-while-drilling (SWD) system, comprising:
   a drilling system that comprises a drilling rig, a drill string, and a drilling bit, the drilling system configured to initiate formation of a wellbore from a terranean surface toward a subterranean zone at a particular depth beneath the terranean surface, the drilling system comprising a passive acoustic energy source;
   an acoustic receiver system that comprises a plurality of acoustic energy receivers positioned at the terranean surface, the plurality of acoustic energy receivers comprising:
      a first set of acoustic energy receivers positioned with a first geometric arrangement on the terranean surface, wherein the first geometric arrangement comprises a first square-shaped ring centered on a wellhead of the wellbore that includes the first set of acoustic energy receivers and a first square-shaped exclusion zone within the first square-shaped ring that excludes the first set of acoustic energy receivers,
      a second set of acoustic energy receivers positioned with a second geometric arrangement on the terranean surface different than the first geometric arrangement, wherein the second geometric arrangement comprises a second square-shaped ring centered on the wellhead of the wellbore that includes the second set of acoustic energy receivers and a second square-shaped exclusion zone within the second square-shaped ring that excludes the second set of acoustic energy receivers and comprises an area that encompasses the first square-shaped ring and the first square-shaped exclusion zone, and
      a third set of acoustic energy receivers positioned with a third geometric arrangement on the terranean surface different than the first and second geometric arrangements, wherein the third geometric arrangement comprises a cross centered on the wellhead of the wellbore that includes the third set of acoustic energy receivers; and
   an acoustic energy processing system configured to perform operations comprising:
      recording acoustic signals produced by the passive acoustic energy source with the plurality of acoustic energy receivers during the formation of the wellbore, the recording comprising:
         recording a first set of acoustic signals produced by the passive acoustic energy source with the first set of acoustic energy receivers between the terranean surface and a first depth,
         recording a second set of acoustic signals produced by the passive acoustic energy source with the second set of acoustic energy receivers between the first depth and a second depth deeper than the first depth, and
         recording a third set of acoustic signals produced by the passive acoustic energy source with the third set of acoustic energy receivers between the terranean surface and a third depth deeper than the first depth;
      processing the recorded acoustic signals to predict a subterranean location of the passive acoustic energy source, and
      based on the predicted subterranean location of the passive energy source, controlling the drilling system to geo-steer the drilling bit toward the particular depth beneath the terranean surface.

10. The SWD system of claim 9, wherein the passive acoustic energy source comprises the drilling bit and at least a portion of a drill string of the drilling system, and the recorded acoustic signals comprise direct acoustic signals from the passive acoustic energy source and reflected acoustic signals from the passive acoustic energy source.

11. The SWD system of claim 10, wherein the first geometry covers a first spatial area on the terranean surface, the second geometry covers a second spatial area on the terranean surface larger than the first spatial area, and the third geometry covers a third spatial area on the terranean surface larger than the second spatial area.

12. The SWD system of claim 11, wherein the operation of processing the recorded acoustic signals to predict a subterranean location of the passive acoustic energy source comprises:
cross-correlating the recorded acoustic signals from different ones of the acoustic receivers in the plurality of acoustic receivers;
determining travel-time difference images of the recorded acoustic signals from the passive acoustic energy source and the different ones of the acoustic receivers in the plurality of acoustic receivers; and
stacking the travel-time difference images.

13. The SWD system of 11, wherein the third depth is deeper than the second depth.

14. The SWD system of 9, wherein the third depth is deeper than the second depth.

15. The SWD system of claim 14, wherein the first depth is at 250 meters, the second depth is at 500 meters, and the third depth is at 1000 meters.

16. The SWD system of claim 9, wherein the first geometry covers a first spatial area on the terranean surface, the second geometry covers a second spatial area on the terranean surface larger than the first spatial area, and the third geometry covers a third spatial area on the terranean surface larger than the second spatial area.

17. The SWD system of claim 9, wherein the operation of processing the recorded acoustic signals to predict a subterranean location of the passive acoustic energy source comprises:
cross-correlating the recorded acoustic signals from different ones of the acoustic receivers in the plurality of acoustic receivers;
determining travel-time difference images of the recorded acoustic signals from the passive acoustic energy source and the different ones of the acoustic receivers in the plurality of acoustic receivers; and
stacking the travel-time difference images.

18. A computer-implemented method for determining a drill bit location, comprising:
identifying, with one or more hardware processors of an acoustic energy processing system, a plurality of acoustic energy signals received at a plurality of sets of acoustic receivers from a passive acoustic energy source that is part of a wellbore drilling system, wherein each of the plurality of sets of acoustic receivers cover a unique spatial area and is configured to detect at least a portion of the plurality of acoustic energy signals at a unique depth range beneath the terranean surface, the plurality of sets of acoustic receivers comprising:
a first set of acoustic receivers positioned with a first geometric arrangement on the terranean surface, wherein the first geometric arrangement comprises a first square-shaped ring centered on a wellhead of the wellbore drilling system that includes the first set of acoustic receivers and a first square-shaped exclusion zone within the first square-shaped ring that excludes the first set of acoustic receivers,
a second set of acoustic receivers positioned with a second geometric arrangement on the terranean surface different than the first geometric arrangement, wherein the second geometric arrangement comprises a second square-shaped ring centered on the wellhead that includes the second set of acoustic receivers and a second square-shaped exclusion zone within the second square-shaped ring that excludes the second set of acoustic receivers and comprises an area that encompasses the first square-shaped ring and the first square-shaped exclusion zone, and
a third set of acoustic receivers positioned with a third geometric arrangement on the terranean surface different than the first and second geometric arrangements, wherein the third geometric arrangement comprises a cross centered on the wellhead that includes the third set of acoustic receivers;
processing, with the one or more hardware processors of the acoustic energy processing system, the plurality of acoustic energy signals, the processing comprising:
processing a first set of acoustic signals produced by the passive acoustic energy source with the first set of acoustic receivers between the terranean surface and a first depth,
processing a second set of acoustic signals produced by the passive acoustic energy source with the second set of acoustic receivers between the first depth and a second depth deeper than the first depth, and
processing a third set of acoustic signals produced by the passive acoustic energy source with the third set of acoustic receivers between the first depth and a third depth deeper than the second depth;
determining, with the one or more hardware processors of the acoustic energy processing system, a location of a drill bit of the wellbore drilling system based on the processed plurality of acoustic signals; and
updating, with the one or more hardware processors of the acoustic energy processing system, a geo-steering path of the drill bit based on the determined location of the drill bit.

19. The computer-implemented method of claim 18, wherein the passive acoustic energy source comprises at least one of the drill bit or one or more casing collars of the drilling system.

20. The computer-implemented method of claim 19, further comprising:
validating, with the one or more hardware processors of the acoustic energy processing system, a unique geometry of each set of the plurality of sets of acoustic receivers.

21. The computer-implemented method of claim 20, wherein processing comprises:
cross-correlating the recorded acoustic signals from different ones of the acoustic receivers in each set of the plurality of sets of acoustic receivers;
determining travel-time difference images of the recorded acoustic signals from the passive acoustic energy source and the different ones of the acoustic receivers in the set of acoustic receivers; and
stacking the travel-time difference images.

22. The computer-implemented method of claim 18, further comprising:
validating, with the one or more hardware processors of the acoustic energy processing system, a unique geometry of each set of the plurality of sets of acoustic receivers.

23. The computer-implemented method of claim 18, wherein processing comprises:
cross-correlating the recorded acoustic signals from different ones of the acoustic receivers in each set of the plurality of sets of acoustic receivers;

determining travel-time difference images of the recorded acoustic signals from the passive acoustic energy source and the different ones of the acoustic receivers in the set of acoustic receivers; and stacking the travel-time difference images.

* * * * *

UNITED STATES PATENT AND TRADEMARK OFFICE
CERTIFICATE OF CORRECTION

PATENT NO. : 11,346,972 B2
APPLICATION NO. : 16/284803
DATED : May 31, 2022
INVENTOR(S) : Mustafa Naser Al-Ali et al.

It is certified that error appears in the above-identified patent and that said Letters Patent is hereby corrected as shown below:

In the Claims

In Column 21, Line 17, Claim 13, please replace "system of" with -- claim --.

In Column 21, Line 19, Claim 14, please replace "system of" with -- claim --.

Signed and Sealed this
Thirteenth Day of December, 2022

Katherine Kelly Vidal
*Director of the United States Patent and Trademark Office*